(12) United States Patent
Van De Voorde

(10) Patent No.: US 12,209,410 B2
(45) Date of Patent: Jan. 28, 2025

(54) MODIFIABLE PROFILE SYSTEM

(71) Applicant: JUUNOO NV, Zwevegem (BE)

(72) Inventor: Chris Van De Voorde, Kortrijk (BE)

(73) Assignee: JUUNOO NV, Zwevegem (BE)

( * ) Notice: Subject to any disclaimer, the term of this patent is extended or adjusted under 35 U.S.C. 154(b) by 327 days.

(21) Appl. No.: 16/978,214

(22) PCT Filed: Mar. 6, 2019

(86) PCT No.: PCT/IB2019/051784
§ 371 (c)(1),
(2) Date: Sep. 4, 2020

(87) PCT Pub. No.: WO2019/171280
PCT Pub. Date: Sep. 12, 2019

(65) Prior Publication Data
US 2021/0002894 A1    Jan. 7, 2021

(30) Foreign Application Priority Data

Mar. 8, 2018   (BE) .................................. 2018/5141

(51) Int. Cl.
*E04B 2/74* (2006.01)
*E04B 2/72* (2006.01)
*E04B 2/78* (2006.01)
*F16B 7/14* (2006.01)

(52) U.S. Cl.
CPC .............. *E04B 2/7459* (2013.01); *E04B 2/72* (2013.01); *E04B 2/7809* (2013.01); *F16B 7/1454* (2013.01)

(58) Field of Classification Search
CPC .......... E04B 2/825; E04B 2/76; E04B 2/7809; E04B 2/7818; E04B 2/74; E04B 2/7459; E04B 2/7453; E04B 2002/7496; E04F 19/0413; E04F 19/0463; F16B 7/1454; F16B 7/10; F16B 7/14; F16B 7/16; F16B 2/18; F16B 2/185; F16B 2/02; F16B 2/20;
(Continued)

(56) References Cited

U.S. PATENT DOCUMENTS 3,589,757 A * 6/1971 Mooney ................. F16M 11/32
                                                248/188.5
3,860,350 A * 1/1975 Rogers ...................... F16B 7/10
                                                403/112
(Continued)

OTHER PUBLICATIONS

Search Report for International Patent Application PCT/IB2019/051784, mailed on Sep. 12, 2019.

*Primary Examiner* — Jessica L Laux
(74) *Attorney, Agent, or Firm* — Fresh IP PLC; Clifford D. Hyra; Aubrey Y. Chen

(57) ABSTRACT

The present invention relates to a modifiable profile system (1) for constructing a wall, comprising two construction profiles (2, 3) which are displaceable telescopically with respect to each other and comprise a fixture (4) which is provided so as to be hingeable with respect to a first construction profile (2) of both construction profiles (2, 3) between an open position, in which both construction profiles (2, 3) are displaceable with respect to each other, and a closed position, in which this fixture (4) engages with the second construction profile (3) of both construction profiles (2, 3), so that both construction profiles (2, 3) are fixed with respect to each other.

35 Claims, 15 Drawing Sheets

(58) Field of Classification Search
CPC ... F16B 2/04; E04C 3/005; E04C 3/04; E04C 3/32; E04C 2003/0413
See application file for complete search history.

(56) References Cited

U.S. PATENT DOCUMENTS

| | | | | | |
|---|---|---|---|---|---|
| 4,397,127 | A | * | 8/1983 | Mieyal | E04B 2/789 52/745.12 |
| 4,434,970 | A | * | 3/1984 | Boland | F16B 7/105 410/151 |
| 4,492,170 | A | * | 1/1985 | Solomon | A47B 9/08 108/146 |
| 4,761,092 | A | * | 8/1988 | Nakatani | F16M 11/30 403/109.5 |
| 4,981,227 | A | * | 1/1991 | Ingram | A47B 96/06 211/208 |
| 5,685,121 | A | * | 11/1997 | DeFrancesco | E04C 3/07 52/241 |
| 5,735,100 | A | * | 4/1998 | Campbell | E04B 5/14 52/745.11 |
| 5,947,666 | A | * | 9/1999 | Huang | B60P 7/15 410/151 |
| 5,988,963 | A | * | 11/1999 | Shiau | B60P 7/15 410/151 |
| 6,142,699 | A | * | 11/2000 | Pao | F16B 7/1454 403/109.5 |
| 7,574,806 | B2 | * | 8/2009 | Wang | B25G 1/04 33/483 |
| 8,608,416 | B2 | * | 12/2013 | Xiao | B60P 7/15 410/151 |
| 9,481,286 | B1 | * | 11/2016 | Xiao | E04B 5/14 |
| 2004/0101351 | A1 | * | 5/2004 | Pitcher | F16B 7/1454 403/109.5 |
| 2005/0186028 | A1 | * | 8/2005 | Stahle | F16B 7/1418 403/377 |

* cited by examiner

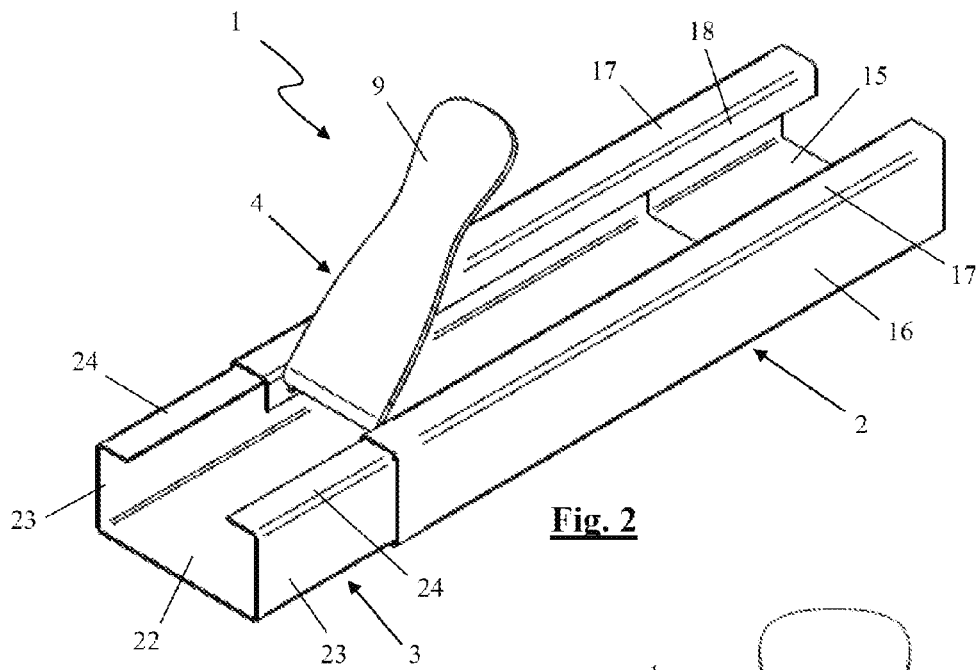
Fig. 2
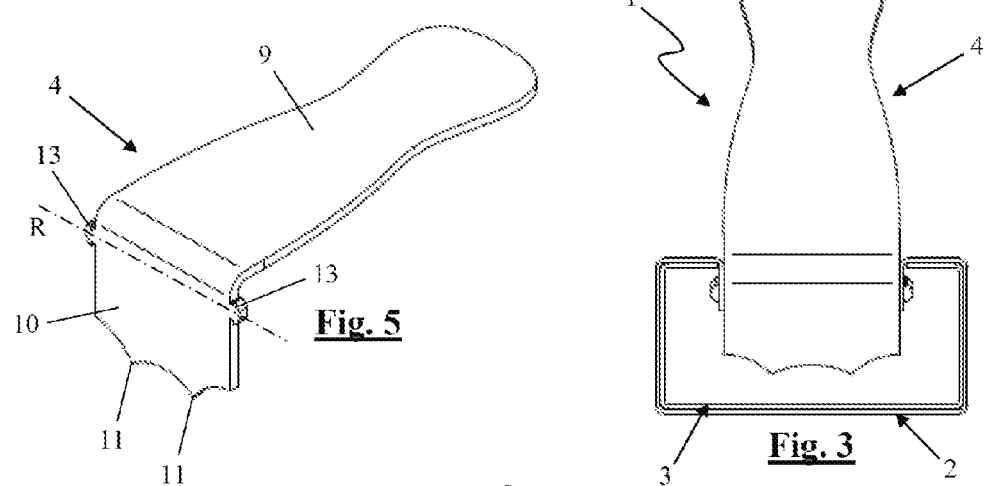
Fig. 5
Fig. 3
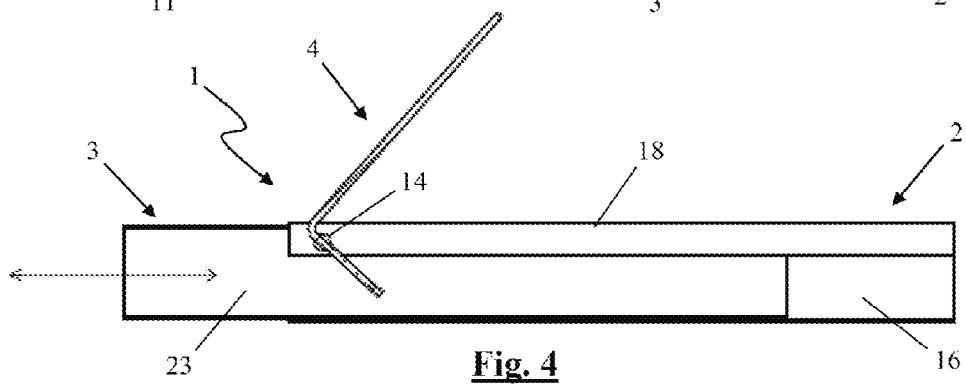
Fig. 4

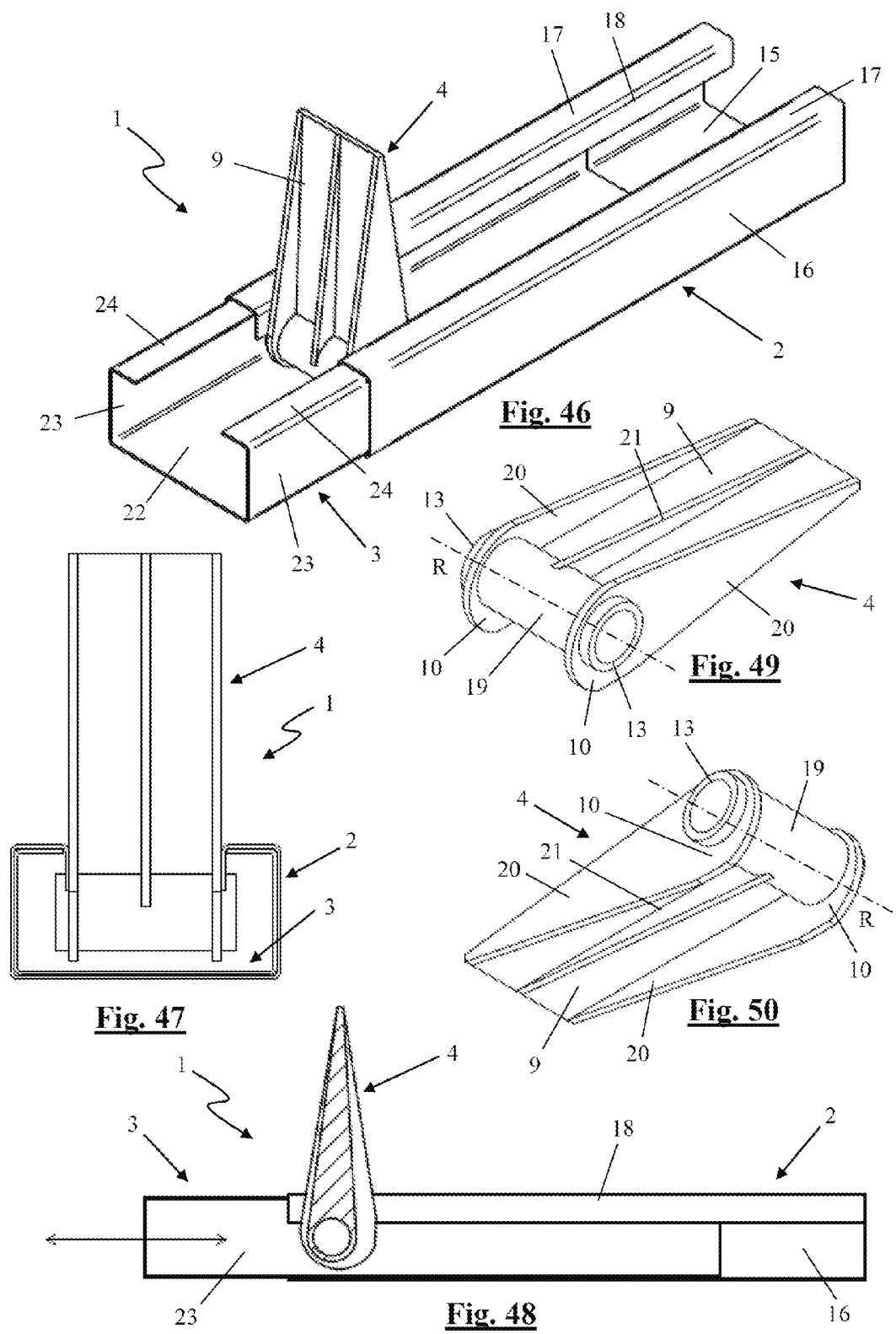

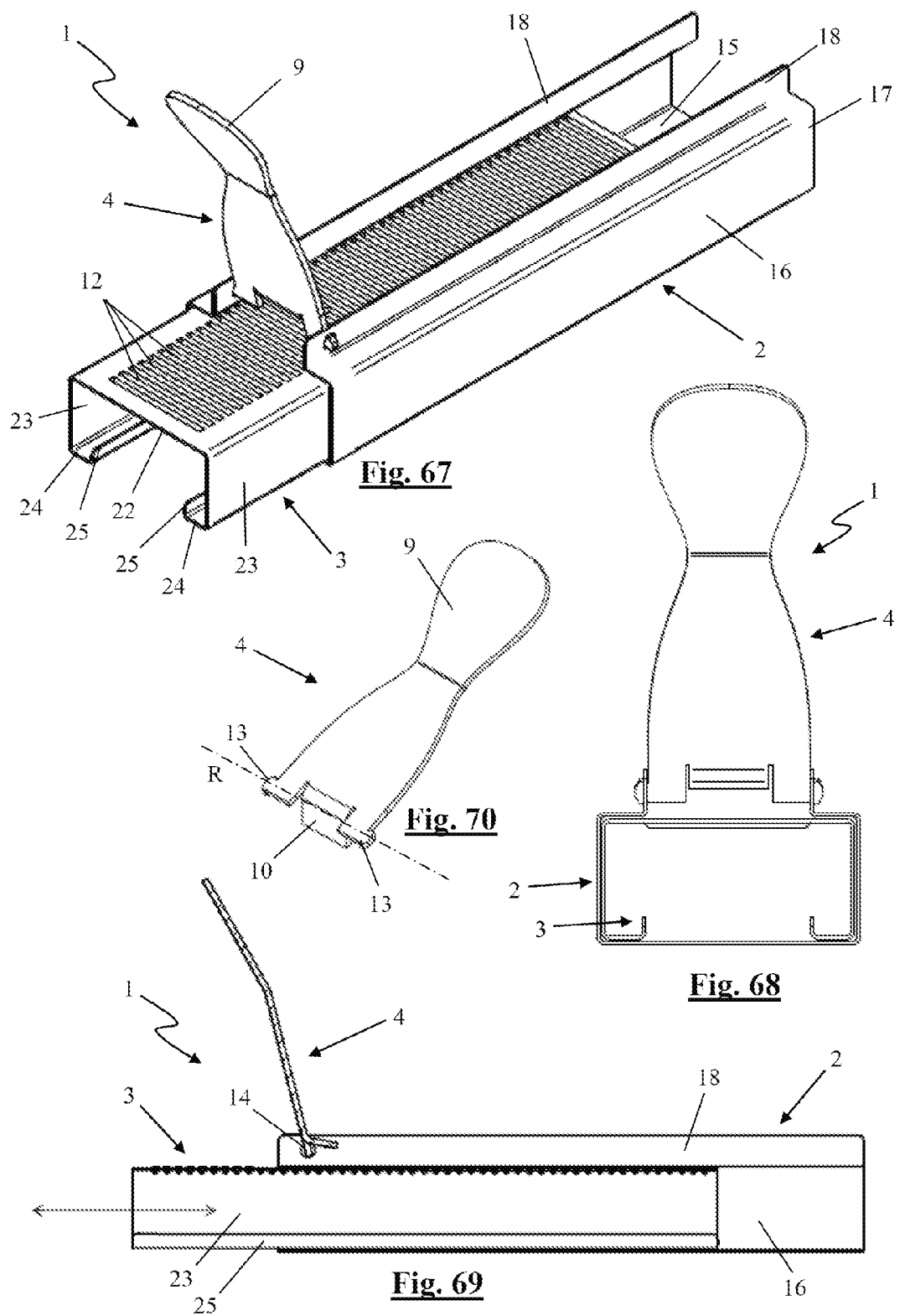

MODIFIABLE PROFILE SYSTEM

The present invention relates to a modifiable profile system for constructing a wall, comprising two construction profiles which are displaceable telescopically with respect to each other, and comprising fixing means for fixing the construction profiles with respect to each other, wherein the fixing means comprise a tension clamp which is provided so as to be hingeable with respect to a first construction profile of both construction profiles between an open position, in which both construction profiles are displaceable with respect to each other, and a closed position, in which this tension clamp engages with the second construction profile of both construction profiles, so that both construction profiles are fixed with respect to each other.

Such profile systems are typically used for constructing inner walls from prefabricated materials, in which wall elements are fitted onto these profile systems, such as plasterboard panels, plywood panels, MDF panels, textile, etc.

Examples of such profile systems are known, for example, from CA1310803C, FR2966482A1, AU2006201344A1, GB2084629A, FR2966482A1, U.S. Pat. Nos. 1,998,688 and 3,897,668. The construction profiles which are displaceable telescopically with respect to each other are in this case first fitted between a floor and a ceiling, then pulled out telescopically with respect to each other until they touch the floor and the ceiling or profiles fitted onto these and are eventually fixed with respect to each other.

In this case, there are several ways of fixing the construction profiles with respect to each other.

In CA1310803C, these construction profiles are mutually fixed by means of screws to this end. However, fixing the construction profiles in this way is relatively laborious. The construction profiles have to be held with respect to each other before being fixed. In addition, a screwdriver is required as an accessory to this end.

In FR2966482A1, the telescopic construction profiles are held in place by friction. It is very difficult in this case to find a good balance between not too much friction so as to ensure that the construction profiles are provided so as to be smoothly telescopically displaceable with respect to each other and not too little friction so that they are not displaced with respect to each other in the desired position. In practice, such a frictional connection is in fact difficult to ensure if these construction profiles are produced in accordance with standard production methods, in view of the tolerances with such construction profiles. In addition, it is difficult to create a strong inner wall with these.

In AU2006201344A1, GB2084629A and U.S. Pat. No. 1,998,688, these construction profiles remain mutually slidable, but each of these construction profiles is click-fitted on respective profiles which have been fitted on the floor and the ceiling, or are fixed with respect to these profiles in another way. By means of these systems, it is possible to fit the profiles quickly and efficiently without the use of hand tools. However, a drawback of these solutions is the fact that the construction profiles in this case always have to be positioned accurately on the floor and the ceiling, virtually perpendicular to the profiles. This solution is therefore less suitable in cases where a floor and/or a ceiling have not been finished evenly in practice.

In U.S. Pat. No. 3,897,668, such construction profiles are forced apart by means of a spring, so that they are clamped between profiles on the floor and the ceiling on account of the spring force of this spring. In this way, these construction profiles can also be fitted in a quick and efficient manner without the use of hand tools. In addition, this solution is also usable in cases where the floor and/or the ceiling between which these construction profiles are fitted is not even. However, this solution is relatively complicated, due to the fact that it is no mean feat to fit a spring in such a way between the construction profiles during production. By means of such a spring, the construction profiles can, in addition, only be displaced telescopically with respect to each other over a limited distance, as a result of which only small differences in height can be compensated for.

It is the object of the present invention to provide such a profile system by means of which construction profiles can be installed quickly and efficiently without using hand tools, in which the abovementioned problems are solved.

This object of the invention is achieved by providing a modifiable profile system as described in the first paragraph of this description in which the tension clamp is configured to engage with the second construction profile during the hinging movement between the open position and the closed position from an engagement position to the closed position, in such a manner that the tension clamp exerts a force on the construction profiles between the engagement position and the closed position in order to force these construction profiles telescopically apart.

Such a tension clamp may be achieved in a very simple manner and allows a quick and efficient installation of the construction profiles without hand tools being required for this purpose.

By means of such a tension clamp, it is also readily possible to provide construction profiles which are displaceable telescopically with respect to each other over a relatively large distance, wherein these may be fixed in any position with respect to each other by means of this tension clamp.

In this case, this tension clamp may assume a significant number of forms and may, for example, be made of metal or plastic by means of punching, bending, injection-moulding, etc. This may be provided so as to be hingeable with respect to the first construction profile in a significant number of ways. This may be effected by means of pins, bolts and nuts, axle stubs, etc. Examples of clamps which may serve as a tension clamp in a profile system according to the present invention are known, for example, in the form of quick-release clamps.

In this case, the construction profiles may also assume a significant number of forms, such as aluminium, steel, plastic or wooden profiles. These may be, for example, cold-rolled, bent or extruded or sawn, etc.

The cross section of the construction profiles is virtually identical over at least a part of their length. These construction profiles may be separate profiles or may, for example, form part of a larger arrangement, such as an L-shaped corner piece or an arch-shaped corner piece, etc.

In order to provide these construction profiles so as to be displaceable telescopically with respect to each other, one of the two profiles will comprise a cavity in which at least a part of the other profile can slidably be fitted by means of a front side of the one profile. In this case, both profiles extend virtually along the same longitudinal direction next to this front side. To this end, these construction profiles comprise at least a part which is straight over a certain amount of its length, but may also comprise curved parts and/or corners.

The one construction profile is thus at least partly hollow, in which case it comprises an access opening for this cavity at a front side. The other construction profile may be solid. This other profile will preferably also be least partly hollow, thus resulting in a lightweight profile system.

Typically, such a profile system will be used to form a vertical column, typically between a floor and a ceiling, or between profiles which have been fitted onto such a floor and ceiling. However, the construction profiles of this profile system may also be arranged in any other direction. In this way, such a profile system can not only be used to compensate for several different heights in a simple way, but also for widths. In a diagonal direction, it may, for example, serve as an adjustable wind bracing which can easily be installed.

The tension clamp is configured to engage with the second construction profile during the hinging movement between the open position and the closed position from an engagement position to the closed position, in such a manner that the tension clamp between the engagement position and the closed position exerts a force on the construction profiles so as to force these construction profiles being telescopically moved apart. In this way, the construction profiles can readily be clamped between two parts, such as for example a floor and a ceiling, by means of this force. In this way, this profile system can be installed more easily by a single person without requiring further aids, except for, for example, a spirit level.

The tension clamp of a profile system according to the present invention is preferably hingeable with respect to a hinge axis which extends virtually perpendicular to the longitudinal direction of the construction profiles. In this case, the hinging movement of the tension clamp may then simply be executed after a telescopic displacement movement of the construction profiles. By means of such a hinge axis, it is also relatively easy to exert a said force on the second construction profile using this tension clamp. Such a hinge axis also makes it readily possible to arrange the tension clamp to be hingeable with respect to the construction profiles in such a way that it does not form a bothersome projection with respect to the construction profiles in the closed position. Thus, this tension clamp may allow unhindered installation of, for example, wall elements against these construction profiles. If a wall is constructed using this profile system, then the tension clamp may, to this end, simply be installed on a side of the construction profiles which extends completely between wall elements in a wall constructed using this profile system. Preferably, in a closed position, the tension clamp extends virtually completely in the cavity of the one construction profile.

The term longitudinal direction is understood to mean the direction in which the construction profiles are arranged so as to be displaceable telescopically with respect to each other. This longitudinal direction coincides with the longitudinal direction of the part of the construction profiles which, to this end, is straight next to the front side of the construction profiles along which these have been fitted inside one another telescopically. With construction profiles which are entirely straight, this is the effective longitudinal direction of these construction profiles.

The tension clamp furthermore preferably comprises a handle for driving the hinging movement, so that it is readily operable by hand in order to be able to install the profile system without the use of further aids.

Preferably, the tension clamp comprises at least one engagement element for engaging with the second construction profile by means of this engagement element.

This engagement element is preferably arranged eccentrically with respect to the hinge axis around which the tension clamp is arranged.

Such an engagement element may, more specifically, comprise one or several engagement pins for engaging with the second construction profile by means of these engagement pins. Using such engagement pins, the degree to which the second construction profile is engaged and the degree to which said force is optionally exerted on the second construction profile may be determined with a greater degree of certainty. In this case, the number of engagement pins will preferably be chosen as a function of the arrangement thereof and as a function of the materials of both the tension clamp and the second construction profile.

As an alternative or in addition to said engagement pins, the engagement element may at least partly be made from an elastic material in order to determine the degree to which the second construction profile is engaged and the degree to which said force is optionally exerted on the second construction profile with greater certainty.

Rubber or plastic may be chosen, for example, as such elastic material.

If desired, the engagement element may be made entirely from elastic material. Preferably, only a part of this engagement element is made from elastic material. This elastic material may then preferably be arranged adjacent to the second construction profile. However, it could also be arranged between a more rigid piece of the engagement element and the hinge axis around which the tension clamp is arranged so as to be hingeable.

If the tension clamp is provided with a said handle and with a said engagement element, then this handle is preferably arranged at an angle with respect to the engagement element, so that the two do not extend in line with each other.

In a specific embodiment, the second construction profile is provided with one or several engagement slots for the engagement element to engage with for engaging with the second construction profile. By means of such engagement slots, it is also possible to determine the degree to which the second construction profile is engaged with and the degree to which said force is optionally exerted on the second construction profile with greater certainty.

In this case, such engagement slots then preferably extend virtually perpendicular to the longitudinal direction of the second construction profile.

The tension clamp of a profile system according to the present invention is preferably rotatably attached to the first construction profile in order to arrange this so as to be hingeable with respect to this first construction profile.

In a specific embodiment, the tension clamp comprises an axle stub and the first construction profile comprises a fitting cavity, in which the axle stub of the tension clamp is fittable in order to arrange this tension clamp so as to be hingeable with respect to this first construction profile.

Preferably, the tension clamp in this case comprises such an axle stub on both sides, these axle stubs together defining the hinge axis around which this tension clamp is arranged so as to be hingeable. In this case, the first construction profile comprises a corresponding fitting cavity on both sides.

The first construction profile preferably comprises a bottom and two side walls which are upright with respect to this bottom and which delimit a cavity, in which the second construction profile is arranged so as to be telescopically displaceable.

By means of such upright side walls, it is easy to attach wall elements on both sides of these construction profiles by attaching these on each of these upright side walls.

To this end, the first construction profile may comprise, for example, a substantially U-shaped cross section or a substantially C-shaped cross section or a substantially H-shaped cross section.

The tension clamp preferably extends substantially between these side walls of the first construction profile. In this way, it may readily be ensured that the tension clamp does not form a bothersome projection with respect to the construction profiles. Still more preferably, the tension clamp, in a closed position, to this end extends virtually completely in said cavity in the first construction profile.

Said side walls of such a first construction profile are preferably provided with flanges, the tension clamp being provided so as to be hingeable with respect to these flanges and extending preferably substantially between these flanges.

More specifically, each side wall of such a first construction profile, away from the bottom, may be provided with an upright edge with the corresponding flange at the end of the upright edge, away from the side wall, being upright with respect to this upright edge.

In this way, it is possible to ensure that each flange extends virtually parallel to the corresponding side wall.

In this case, the upright edges are preferably arranged so as to face each other. In this case, the flanges preferably extend between the side walls.

The second construction profile also preferably comprises a bottom and two side walls which are upright with respect to this bottom and which delimit a cavity, this in order to make this second construction profile as lightweight as possible.

The outer periphery of the cross section of the second construction profile preferably virtually corresponds to the inner periphery of the cross section of the first construction profile, this in the parts thereof which are straight in order to be able to arrange these so as to be telescopically displaceable with respect to each other, so that the second construction profile is guided in an optimum manner in the first construction profile during the telescopic displacement.

The object of the present invention is also achieved by providing a frame system comprising several construction profiles, which are arranged in a frame shape, this frame system comprising one or several profile systems according to the present invention.

In addition, the object of the present invention is also achieved by providing a wall system, comprising a profile system and wall elements for attachment to this profile system, wherein the profile system is a profile system according to the present invention.

In this case, plaster walls, plywood panels, MDF panels, textile, etc. may, for example, serve as wall elements. These wall elements may be provided so as to be attachable to this profile system in kinds of ways, including screwing, gluing, attaching with hook and loop fastener, etc.

The present invention will now be explained in more detail by means of the following detailed description of some preferred profile systems according to the present invention. The sole aim of this description is to give illustrative examples and to indicate further advantages and particulars of the present invention, and may thus by no means be interpreted as a limitation of the area of application of the invention or of the patent rights defined in the claims.

In this detailed description, reference numerals are used to refer to the attached drawings, in which FIG. 1 shows a wall system according to the present invention in perspective in a partly constructed state;

FIG. 2 shows a first embodiment of a profile system according to the present invention in perspective at the location of the tension clamp, in which this tension clamp is in an open position;

FIG. 3 shows the profile system from FIG. 2 in side view from a front side of the construction profiles, with the tension clamp in an open position;

FIG. 4 shows the profile system from FIG. 2 in longitudinal section, with the tension clamp in an open position;

FIG. 5 shows the tension clamp from the profile system from FIG. 2 separately in perspective;

FIG. 46 shows a fourth embodiment of a profile system according to the present invention in perspective at the location of the tension clamp, with this tension clamp being in an open position;

FIG. 47 shows the profile system from FIG. 46 in side view from a front side of the construction profiles, with the tension clamp being in an open position;

FIG. 48 shows the profile system from FIG. 46 in longitudinal section, with the tension clamp being in open position;

FIG. 49 shows the tension clamp from the profile system from FIG. 2 separately in perspective, viewed from the top side thereof;

FIG. 50 shows the tension clamp from the profile system from FIG. 2 separately in perspective, viewed from the bottom side thereof;

FIG. 67 shows a fifth embodiment of a profile system according to the present invention in perspective at the location of the tension clamp, with this tension clamp being in an open position;

FIG. 68 shows the profile system from FIG. 67 in side view from a front side of the construction profiles, with the tension clamp being in an open position;

FIG. 69 shows the profile system from FIG. 67 in longitudinal section, with the tension clamp being in an open position;

FIG. 70 shows the tension clamp from the profile system from FIG. 67 separately in perspective;

Figure 1:
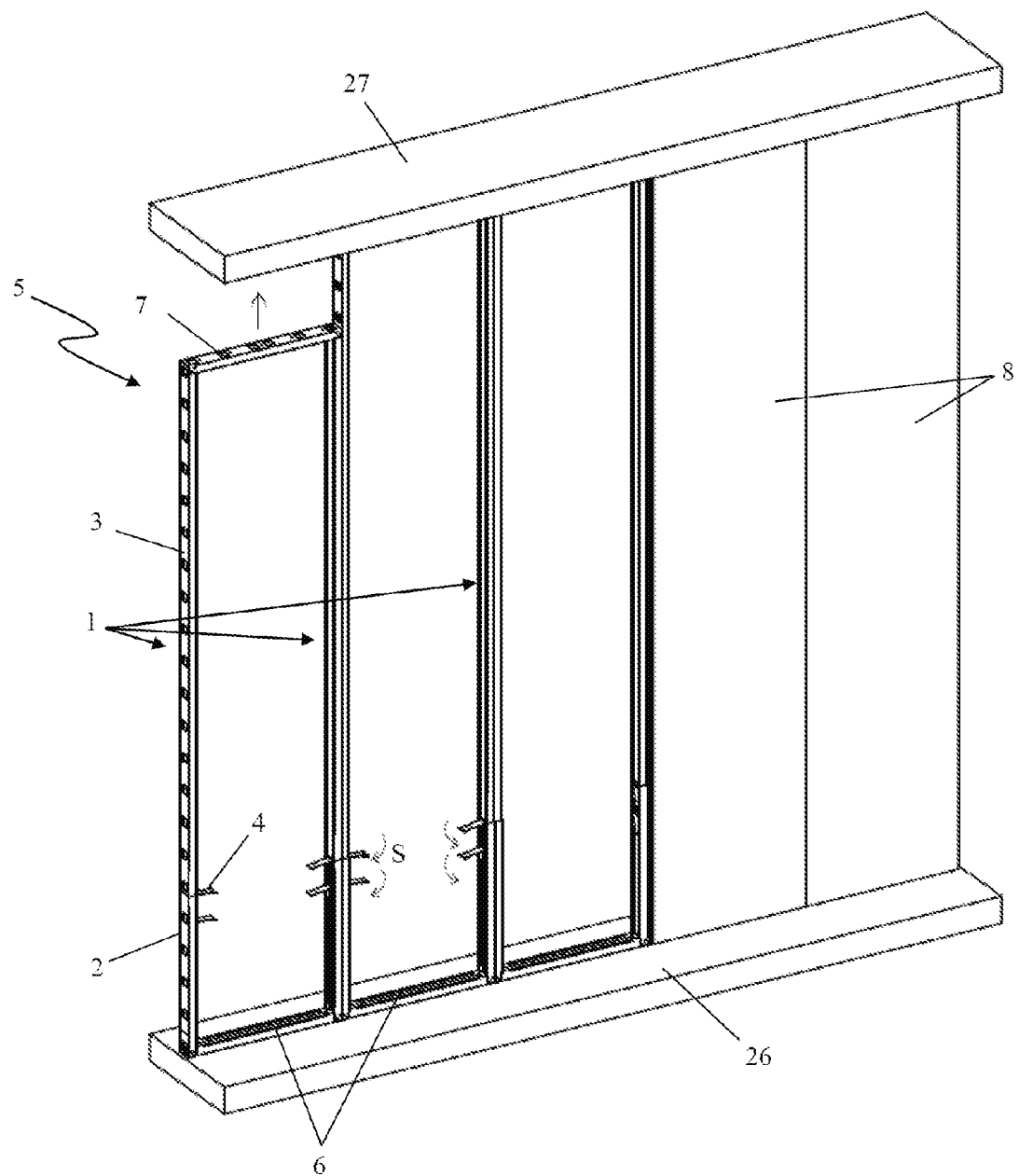
Figure 6:
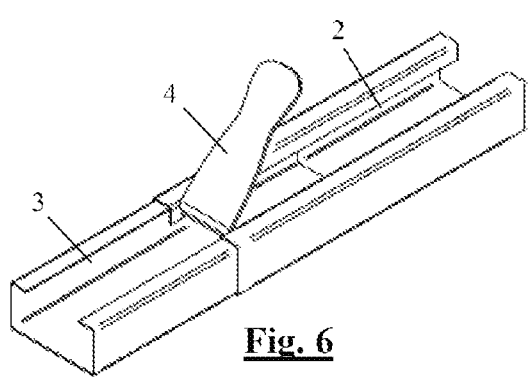
FIG. 6 shows the profile system from FIG. 2 in perspective, with the construction profiles being telescopically moved with respect to each other and the tension clamp being in a position between the open position and the engagement position.
Figure 8:
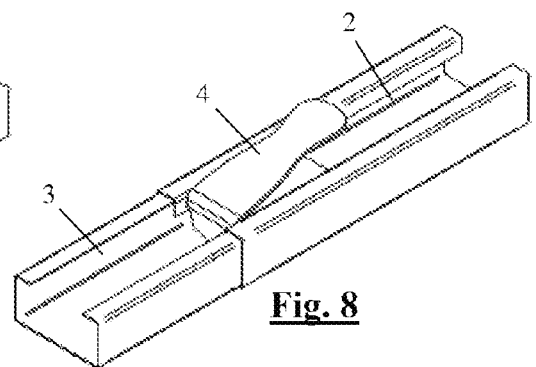
FIG. 8 shows the profile system from FIG. 2 in perspective, with the construction profiles being telescopically moved with respect to each other and the tension clamp being in the engagement position.
Figure 7:
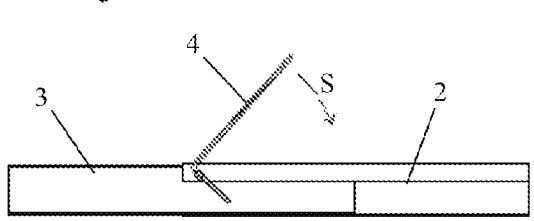
FIG. 7 shows the profile system from FIG. 2 in longitudinal section, with the construction profiles being telescopically moved with respect to each other and the tension clamp being in a position between the open position and the engagement position.
Figure 9:
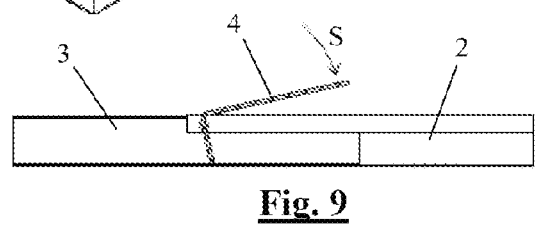
FIG. 9 shows the profile system from FIG. 2 in longitudinal section, with the construction profiles being telescopically moved with respect to each other and the tension clamp being in the engagement position.
Figure 11:
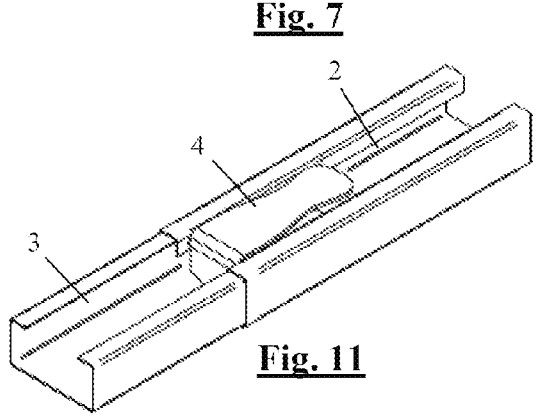
FIG. 11 shows the profile system from FIG. 2 in perspective, with the construction profiles being telescopically moved with respect to each other and the tension clamp being in a position between the engagement position and the closed position.
Figure 10:
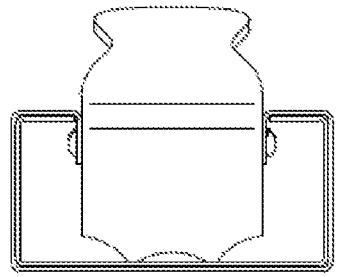
FIG. 10 shows the profile system from FIG. 2 in side view from a front side of the construction profiles, with the tension clamp being in the engagement position.
Figure 12:
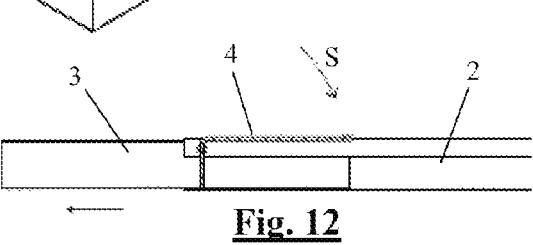
FIG. 12 shows the profile system from FIG. 2 in longitudinal section, with the construction profiles being telescopically moved with respect to each other and the tension clamp being in a position between the engagement position and the closed position.
Figure 13:
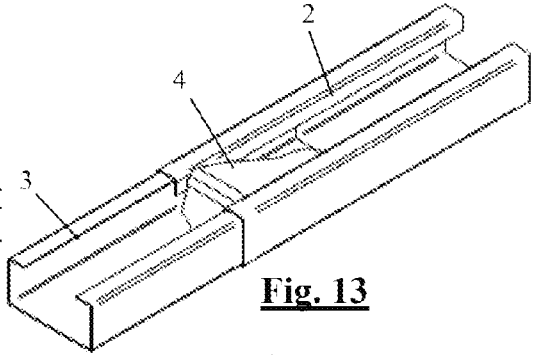
FIG. 13 shows the profile system from FIG. 2 in perspective, with the construction profiles being telescopically moved with respect to each other and the tension clamp being in the closed position.
Figure 15:
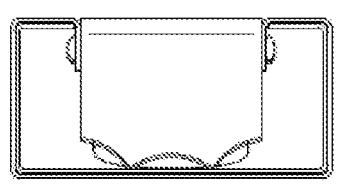
FIG. 15 shows the profile system from FIG. 2 in side view from a front side of the construction profiles, with the tension clamp being in the closed position.
Figure 14:
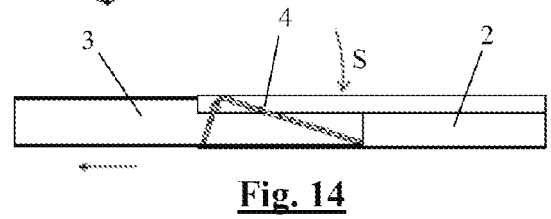
FIG. 14 shows the profile system from FIG. 2 in longitudinal section, with the construction profiles being telescopically moved with respect to each other and the tension clamp being in the closed position.
Figure 16:
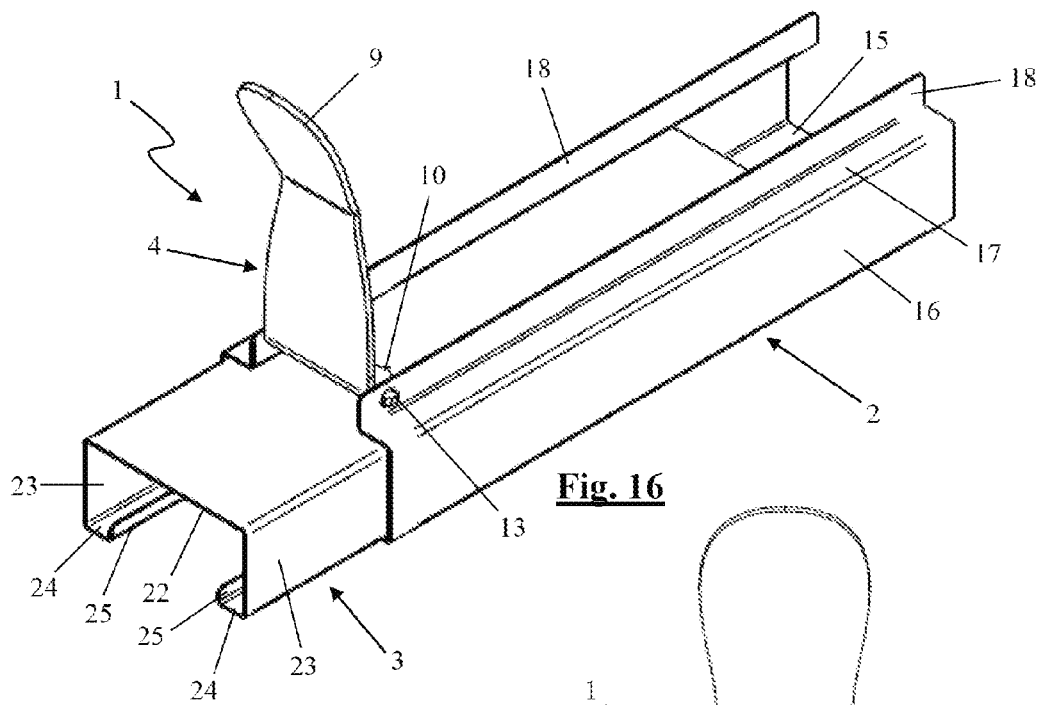
FIG. 16 shows a second embodiment of a profile system according to the present invention in perspective at the location of the tension clamp, this tension clamp being in an open position.
Figure 17:
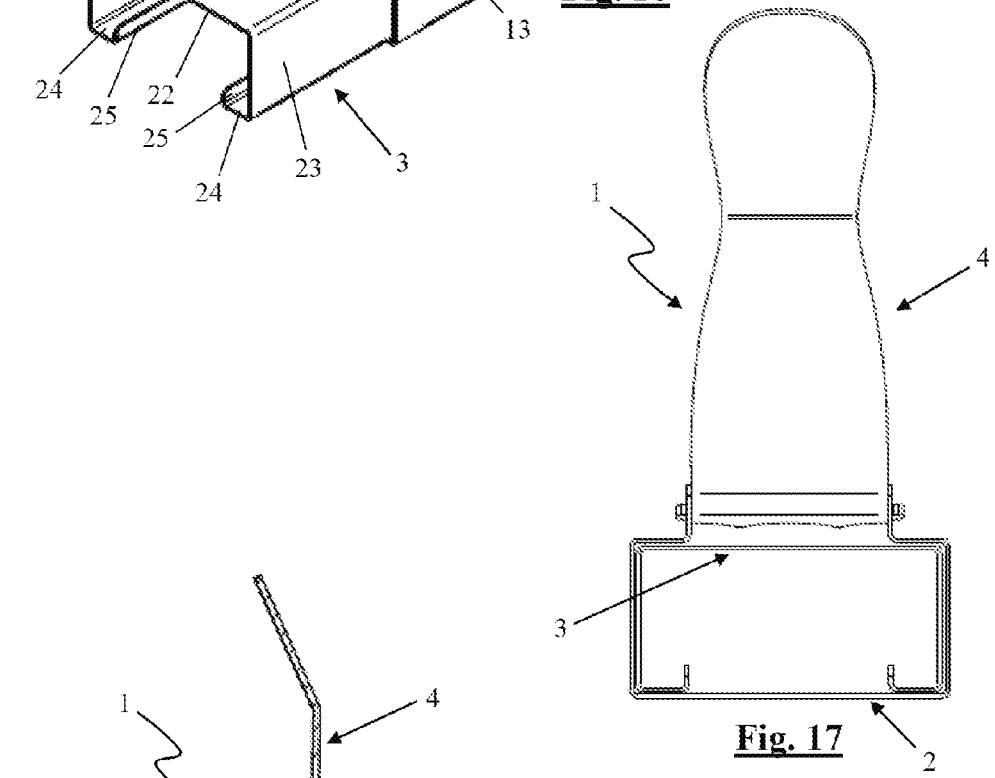
FIG. 17 shows the profile system from FIG. 16 in side view from a front side of the construction profiles, with the tension clamp in an open position.
Figure 18:
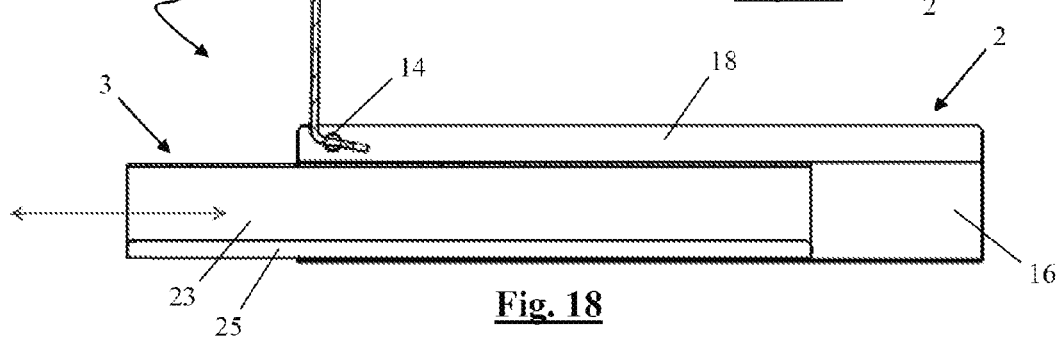
FIG. 18 shows the profile system from FIG. 16 in longitudinal section, with the tension clamp in an open position.
Figure 19:
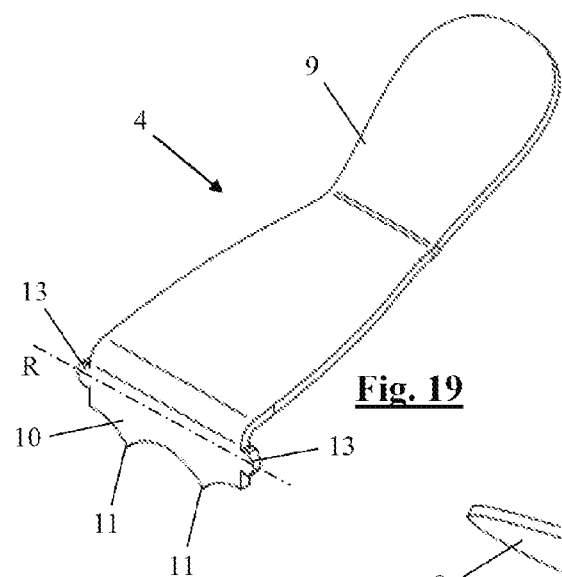
FIG. 19 shows the tension clamp from the profile system from FIG. 16 separately in perspective, viewed from the top side thereof.
Figure 20:
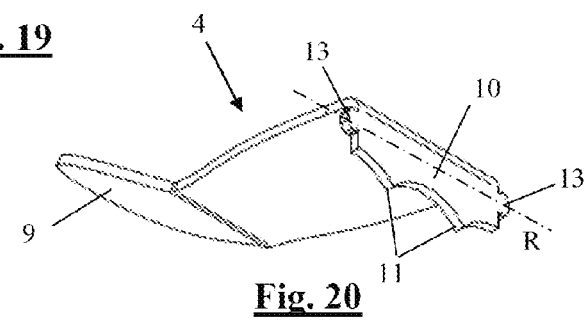
FIG. 20 shows the tension clamp from the profile system from FIG. 16 separately in perspective, viewed from the bottom side thereof.
Figure 21:
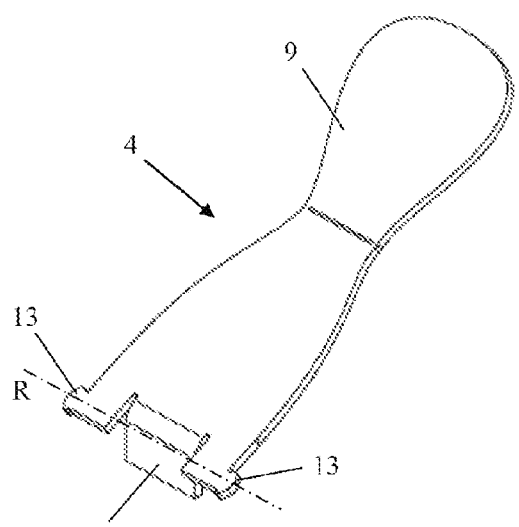
FIG. 21 shows a first alternative embodiment of the tension clamp from the profile system from FIG. 16 separately in perspective, viewed from the top side thereof.
Figure 23:
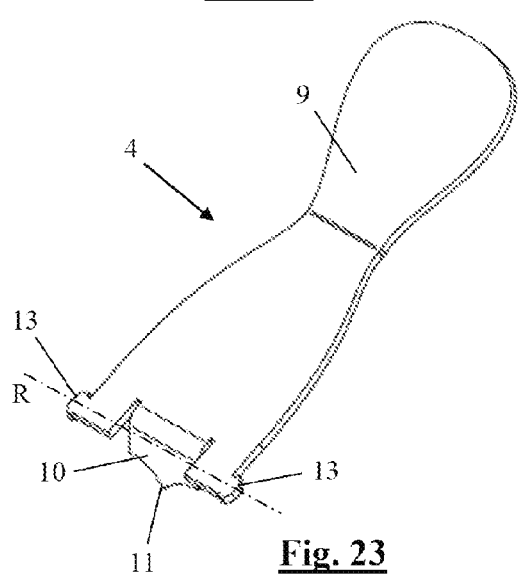
FIG. 23 shows a second alternative embodiment of the tension clamp from the profile system from FIG. 16 separately in perspective, viewed from the top side thereof.
Figure 22:
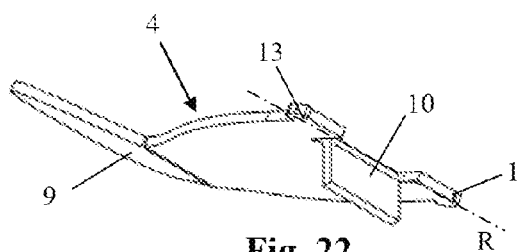
FIG. 22 shows a first alternative embodiment of the tension clamp from the profile system from FIG. 16 separately in perspective, viewed from the bottom side thereof.
Figure 24:
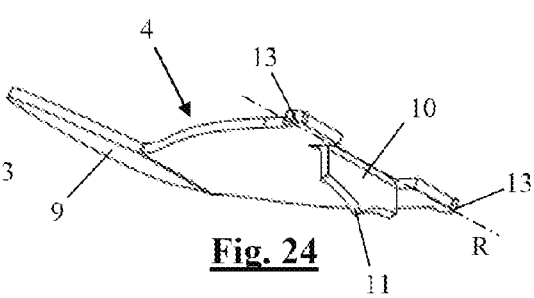
FIG. 24 shows a second alternative embodiment of the tension clamp from the profile system from FIG. 16 separately in perspective, viewed from the bottom side thereof.
Figure 25:
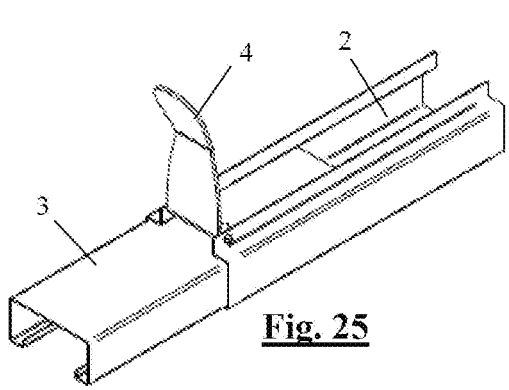
FIG. 25 shows the profile system from FIG. 16 in perspective, with the construction profiles being telescopically moved with respect to each other and the tension clamp being in a position between the open position and the engagement position.
Figure 27:
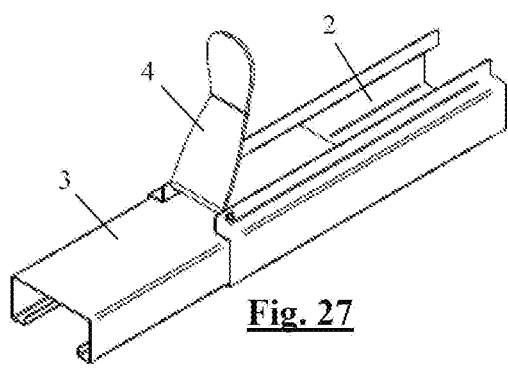
FIG. 27 shows the profile system from FIG. 16 in perspective, with the construction profiles being telescopically moved with respect to each other and the tension clamp being in the engagement position.
Figure 26:
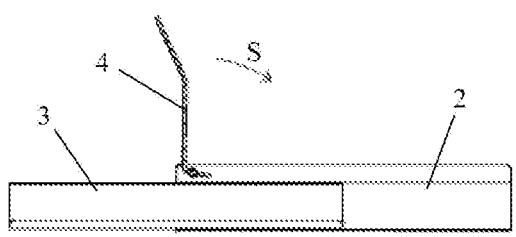
FIG. 26 shows the profile system from FIG. 16 in longitudinal section, with the construction profiles being telescopically moved with respect to each other and the tension clamp being in a position between the open position and the engagement position.
Figure 28:
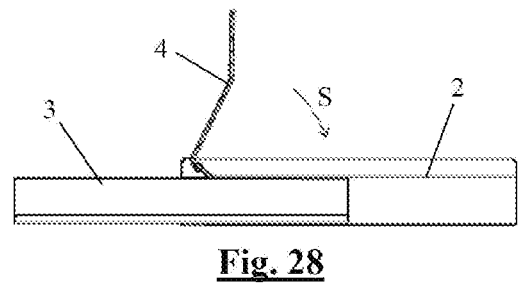
FIG. 28 shows the profile system from FIG. 16 in longitudinal section, with the construction profiles being telescopically moved with respect to each other and the tension clamp being in the engagement position.
Figure 29:
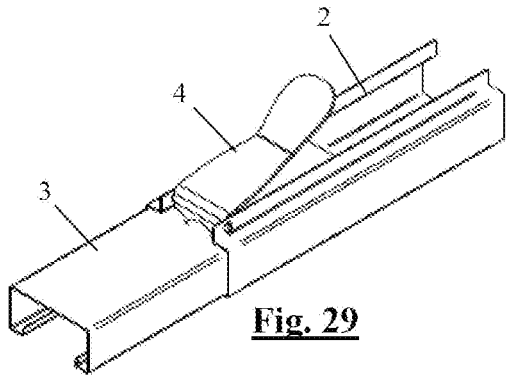
FIG. 29 shows the profile system from FIG. 16 in perspective, with the construction profiles being telescopically moved with respect to each other and the tension clamp being in a position between the engagement position and the closed position.
Figure 31:
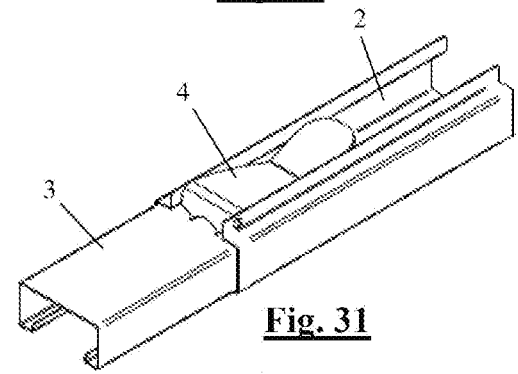
FIG. 31 shows the profile system from FIG. 16 in perspective, with the construction profiles being telescopically moved with respect to each other and the tension clamp being in the closed position.
Figure 30:
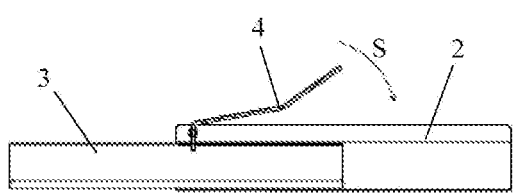
FIG. 30 shows the profile system from FIG. 16 in longitudinal section, with the construction profiles being telescopically moved with respect to each other and the tension clamp being in a position between the engagement position and the closed position.
Figure 32:
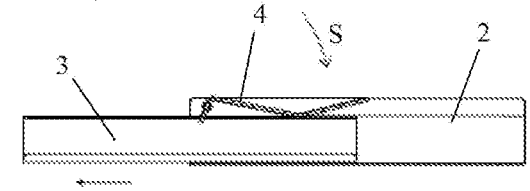
FIG. 32 shows the profile system from FIG. 16 in longitudinal section, with the construction profiles being telescopically moved with respect to each other and the tension clamp being in the closed position.
Figure 33:
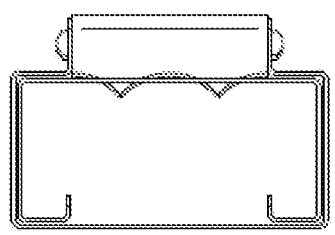
FIG. 33 shows the profile system from FIG. 16 in side view from a front side of the construction profiles, with the tension clamp being in the closed position.
Figure 34:
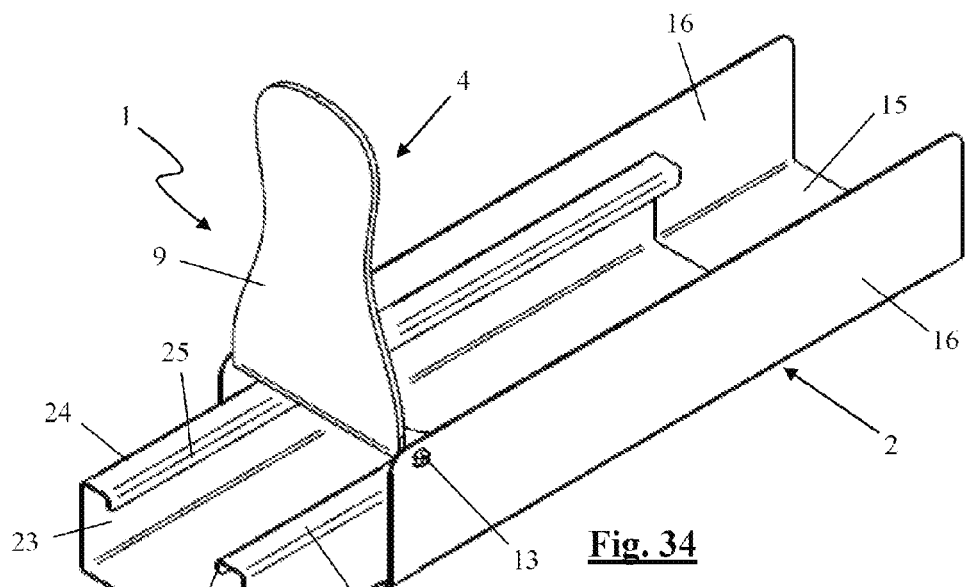
FIG. 34 shows a third embodiment of a profile system according to the present invention in perspective at the location of the tension clamp, this tension clamp being in an open position.
Figure 36:
FIG. 36 shows the tension clamp from the profile system from FIG. 34 separately in perspective.
Figure 35:
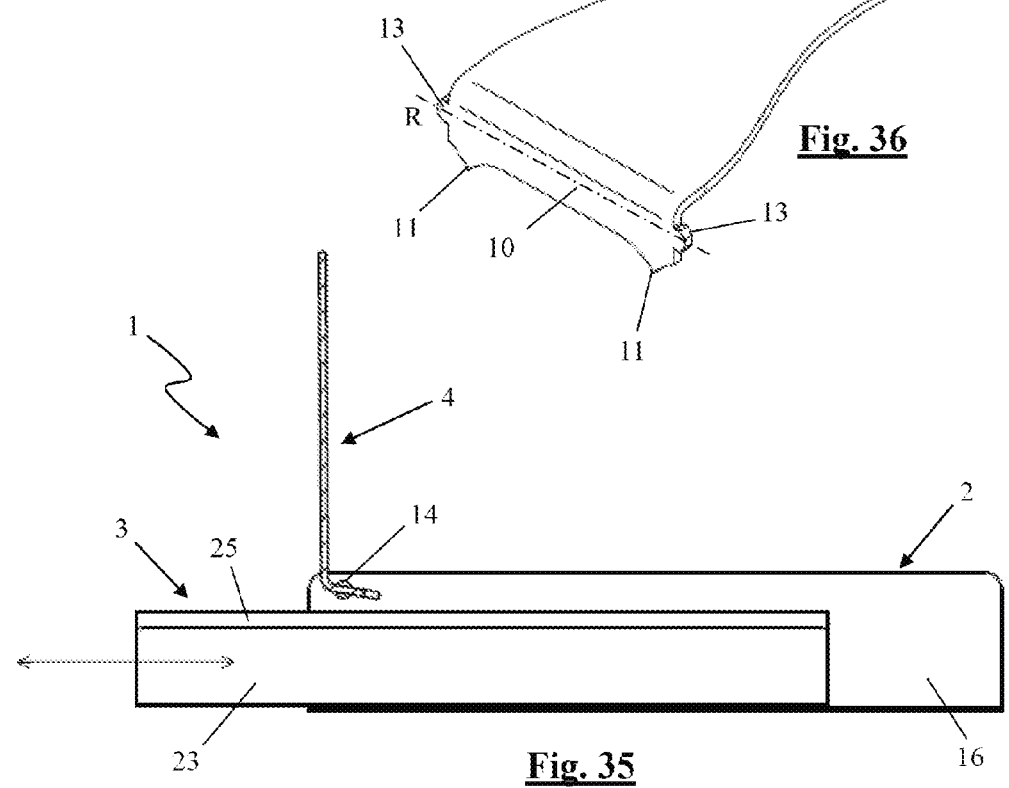
FIG. 35 shows the profile system from FIG. 34 in longitudinal section, with the tension clamp being in open position.
Figure 37:
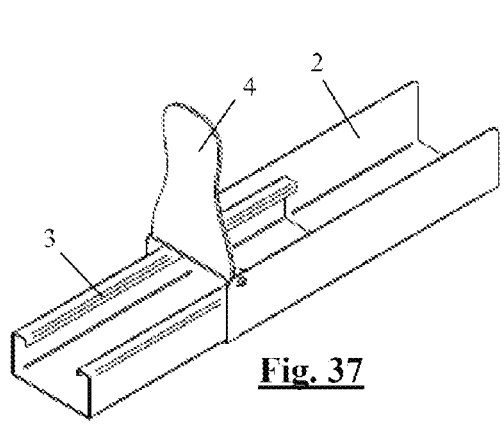
FIG. 37 shows the profile system from FIG. 34 in perspective, with the construction profiles being telescopically moved with respect to each other and the tension clamp being in a position between the open position and the engagement position.
Figure 39:
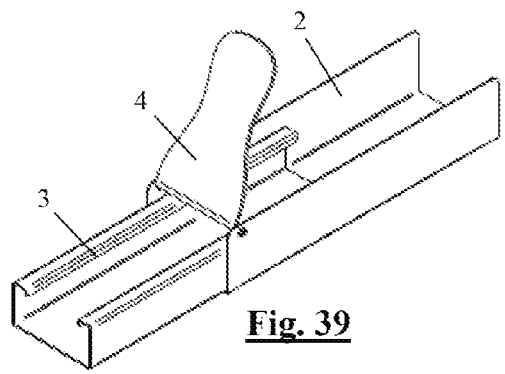
FIG. 39 shows the profile system from FIG. 34 in perspective, with the construction profiles being telescopically moved with respect to each other and the tension clamp being in the engagement position.
Figure 38:
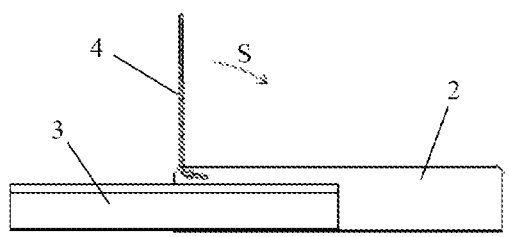
FIG. 38 shows the profile system from FIG. 34 in longitudinal section, with the construction profiles being telescopically moved with respect to each other and the tension clamp being in a position between the open position and the engagement position.
Figure 40:
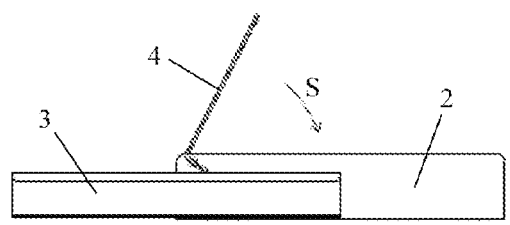
FIG. 40 shows the profile system from FIG. 34 in longitudinal section, with the construction profiles being telescopically moved with respect to each other and the tension clamp being in the engagement position.
Figure 41:
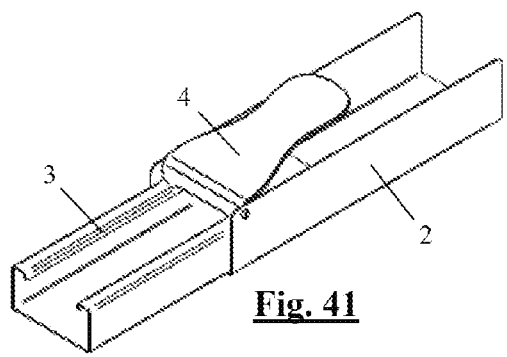
FIG. 41 shows the profile system from FIG. 34 in perspective, with the construction profiles being telescopically moved with respect to each other and the tension clamp being in a position between the engagement position and the closed position.

FIG. 1 shows a wall system (5) according to the present invention. This wall system (5) comprises several profile systems (1) according to the present invention which, together with floor profiles (6) and ceiling profiles (7) are assembled to form frames. In this case, the profile systems (1) form the vertical struts of these frames. In order to construct a wall with this wall system (5), each of these frames is successively placed on a floor (26) by means of its floor profile (6), following which the construction profiles (2, 3) from the profile systems (1) are forced apart telescopically until the ceiling profile (7) is pushed against the ceiling (27). Then, the construction profiles (2, 3) are fixed with respect to each other by means of the tension clamps (4), with the frames being fitted tightly between the floor (26) and the ceiling (27). Several such frames are arranged next to each other and mutually connected in this way. Thereafter, wall elements (8) are attached to these frames. These may be, for example, plaster walls, plywood panels, MDF panels, textile, etc. which are attached to these frames by means of screwing, gluing, hook and loop fastener, etc.

In FIG. 1, a flat wall is constructed in this way. By placing frames at an angle with respect to each other, it is also possible to arrange several walls at an angle with respect to each other. Using curved floor profiles (6) and ceiling profiles (7), it is, for example, also possible to construct a curved wall. The profile systems (1) may also be, for example, at least partly curved or comprise a twist.

In the illustrated embodiment, only the vertical struts of the frames are configured as a profile system (1). It is also possible to analogously configure the floor profile (6) and the ceiling profile (7) as such a profile system (1) in order to be able to modify the width of these frames as well. If the floor profile (6) and the ceiling profile (7) are configured as fixed profiles, then the length thereof is preferably chosen to be such that the corresponding size of the frame corresponds to standard dimensions of plaster walls or MDF panels. Thus, it is possible to quickly construct a wall with only minimal modifications to these wall elements.

The profile systems (1) also do not necessarily form part of frames as illustrated in FIG. 1. It is also possible to install these separately, similar to prior-art profile systems. This is advantageous, for example, in order to construct a wall under a slanting ceiling.

The profile systems (1) illustrated in the figures in each case comprise a first construction profile (2), a second construction profile (3) and a tension clamp (4).

In each case, the second construction profile (3) is arranged telescopically in a cavity of the first construction profile (2). The second construction profile (3) is also of a hollow design. The construction profiles (2, 3) have the same cross section along virtually their entire length. In this case, the outer periphery of the second construction profile (3) in each case adjoins the inner periphery of the first construction profile (3) as closely as possible.

The tension clamp (4) is in each case provided so as to be hingeable with respect to the first construction profile (2), this between an open position and a closed position. The hinge axis (R) about which the tension clamp (4) is in this case arranged to as to be hingeable, is in each case arranged perpendicular to the longitudinal direction of the construction profiles (2, 3). The hinging movement(S) is indicated in several figures with an arrow.

In the open position (see FIGS. 2-4, 16-18, 34-35, 46-48, 67-69 and 80-81), both construction profiles (2, 3) are telescopically displaceable with respect to each other, as is indicated by means of an arrow in FIGS. 4, 18, 35, 48, 69 and 81. In an engagement position between the open position and the closed position (see FIGS. 8-10, 27-28, 39-40, 59-61, 73-74 and 84-86), the tension clamp (4) starts to engage with the second construction profile (3). In the closed position (see FIGS. 10-14, 31-33, 43-45, 64-66, 77-79 and 90-92), the tension clamp (4) engages with the second construction profile (3) in such a manner that both construction profiles (2, 3) are fixed with respect to each other.

Between the engagement position and the closed position (see FIGS. 11-12, 29-30, 41-42, 62-63, 75-76 and 87-89), the tension clamp (4) exerts a force on the construction profiles (2, 3) in order to force these apart telescopically, as is indicated by an arrow in FIGS. 12, 14, 30, 32, 42, 44, 63, 65, 76, 78 and 91.

In the illustrated embodiments, the first construction profile (2) in each case comprises a bottom (15) and two side walls (16) which are upright with respect to this bottom (15). In order to construct a wall using these profile systems (1), the wall elements (8) are attached to these side walls (16). The bottom (15) and side walls (16) delimit a cavity, in which the second construction profile (3) is arranged so as to be telescopically displaceable.

In the illustrated embodiments, the second construction profile (3) also comprises in each case a bottom (22) and two side walls (23) which are upright with respect to this bottom (22), by means of which this second construction profile (3) is arranged in the first construction profile (2) in a guided manner, so that the telescopic displacement movement is guided as well as possible.

These construction profiles (2, 3) may be made from steel plate, for example by means of bending. Alternatively, it would also be possible to extrude similar construction profiles (2, 3) from aluminium or plastic. If desired, the second construction profile (3) could also be of a solid design. This second construction profile (3) may then also be made from, for example, wood.

In the first, in the fourth and in the sixth illustrated embodiment (see FIGS. 2-15, 46-66 and 80-92), each side wall (16) of the first construction profile (2) is provided with an upright edge (17), away from the bottom (15). At the end of the upright edge (17), away from the side wall (16), a flange (18) is in each case provided which is upright with respect to this upright edge (17). This flange (18) is directed towards the bottom (15) of the first construction profile (2). In this case, this flange (18) extends substantially parallel to the corresponding side wall (16).

In this first, this fourth and this sixth embodiment, each side wall (23) of the second construction profile (3) is provided with an upright edge (24). The upright edges (24) of this second construction profile (3) face each other.

In these three embodiments, the bottom (22) of the second construction profile (3) is arranged on the bottom (15) of the first construction profile (2). The upright edges (17) and flanges (18) of the first construction profile (2) are in this case arranged bent around the upright edges (24) of the second construction profile (3).

In this case, the tension clamp (4) is arranged so as to be hingeable between and with respect to the flanges (18) of the first construction profile (2). This tension clamp (4) always extends at least partly into the cavity of the second construction profile (3). In the closed position, this tension clamp (4) extends virtually entirely inside this cavity, as can be seen in FIGS. 13-15, 64-66 and 90-92. In order to engage with the second construction profile (3), the tension clamp (4) here in each case engages with the bottom (22) of this second construction profile (3).

In the second and the fifth illustrated embodiment (see FIGS. 16-33 and 67-79), each side wall (16) of the first construction profile (2), away from the bottom (15), is provided with an upright edge (17). At the end of the upright edge (17), away from the side wall (16), a flange (18) is in each case provided which is upright with respect to this upright edge (17). Here, this flange (18) directed outwards, away from the bottom (15) of the first construction profile (2). In this case, this flange (18) extends substantially parallel to the corresponding side wall (16).

In this second and in this fifth embodiment, each side wall (23) of the second construction profile (3) is provided with an upright edge (24). At the end of the upright edge (24), away from the side wall (23), a flange (25) is in each case provided which is upright with respect to this upright edge (24). Here, this flange (25) is directed inwards, towards the bottom (22) of the second construction profile (3).

In these two embodiments, the upright edges (24) of the second construction profile (3) are arranged on the bottom (15) of the first construction profile (2). In this case, the bottom (22) of the second construction profile (3) is fitted against the upright edges (17) of the first construction profile (2).

In this case, the tension clamp (4) is attached to as to be hingeable between and on the flanges (18) of the first construction profile (2). This tension clamp (4) always extends at least partly into the space between these flanges (18). In the closed position, this tension clamp (4) extends substantially inside this space, as can be seen in FIGS. 31-33 and 77-79. In order to engage with the second construction profile (3), the tension clamp (4) here engages with the bottom (22) of this second construction profile (3).

In the third illustrated embodiment (see FIGS. 34-45), the first construction profile (2) comprises a substantially U-shaped cross section.

In this second embodiment, each side wall (23) of the second construction profile (3) is provided with an upright edge (24). At the end of the upright edge (24), away from the side wall (23), a flange (25) is provided in each case, which is upright with respect to this upright edge (24). Here, this flange (25) is directed inwards, towards the bottom (22) of the second construction profile (3).

In this embodiment, the bottom (22) of the second construction profile (3) is arranged on the bottom (15) of the first construction profile (2). The side walls (16) of the first construction profile (2) extend beyond the side walls (23) of the second construction profile (3).

Figure 43:
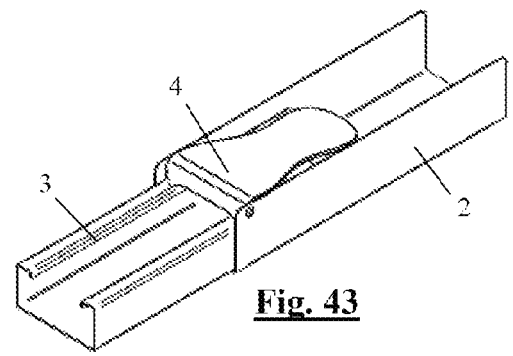
FIG. 43 shows the profile system from FIG. 34 in perspective, with the construction profiles being telescopically moved with respect to each other and the tension clamp being in the closed position.
Figure 42:
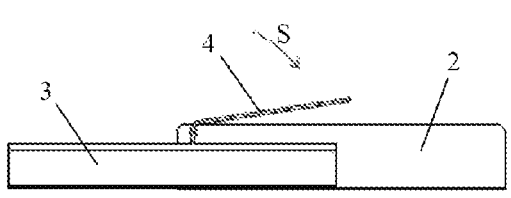
FIG. 42 shows the profile system from FIG. 34 in longitudinal section, with the construction profiles being telescopically moved with respect to each other and the tension clamp being in a position between the engagement position and the closed position.
Figure 44:
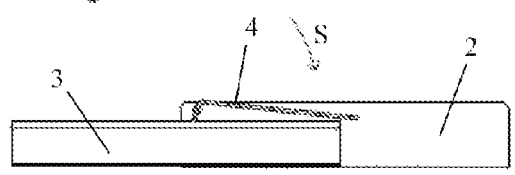
FIG. 44 shows the profile system from FIG. 34 in longitudinal section, with the construction profiles being telescopically moved with respect to each other and the tension clamp being in the closed position.
Figure 45:
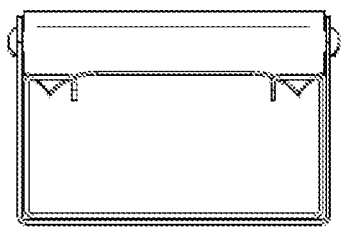
FIG. 45 shows the profile system from FIG. 34 in side view from a front side of the construction profiles, with the tension clamp being in the closed position.
Figure 51:
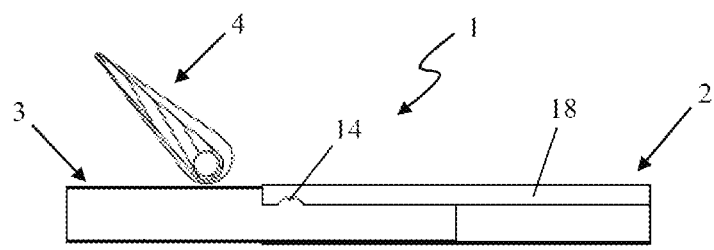
FIGS. 51 to 56 show, in several steps, using longitudinal sections of the profile system from FIG. 46, how a tension clamp of this profile system is fittable so as to be hingeable with respect to the first construction profile (FIGS. 51 to 54) and is subsequently hingeable between an open position and a closed position (FIGS. 54 to 56)
Figure 52:
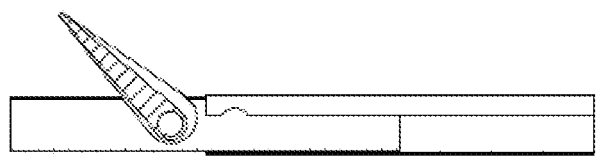
Figure 53:
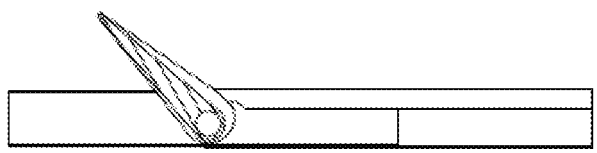
Figure 54:
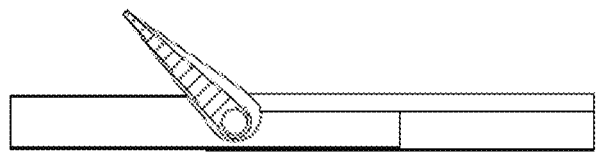
Figure 55:
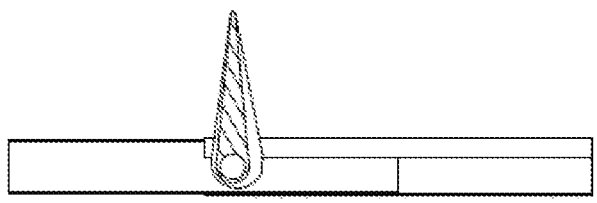
Figure 56:
Figure 57:
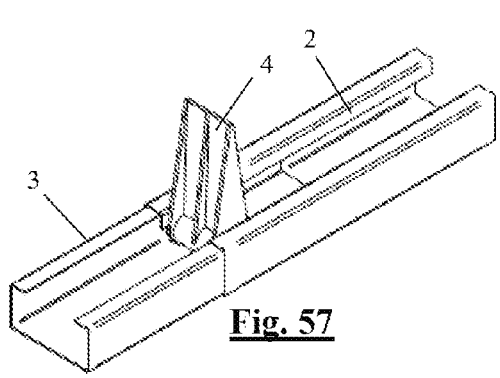
FIG. 57 shows the profile system from FIG. 46 in perspective, with the construction profiles being telescopically moved with respect to each other and the tension clamp being in a position between the open position and the engagement position.
Figure 59:
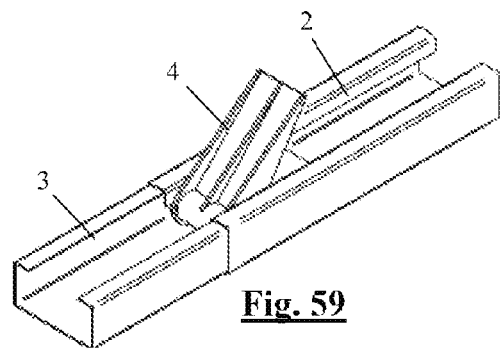
FIG. 59 shows the profile system from FIG. 46 in perspective, with the construction profiles being telescopically moved with respect to each other and the tension clamp being in the engagement position.
Figure 58:
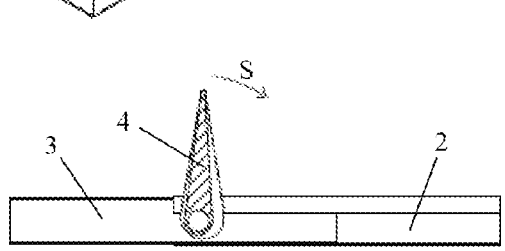
FIG. 58 shows the profile system from FIG. 46 in longitudinal section, with the construction profiles being telescopically moved with respect to each other and the tension clamp being in a position between the open position and the engagement position.
Figure 60:
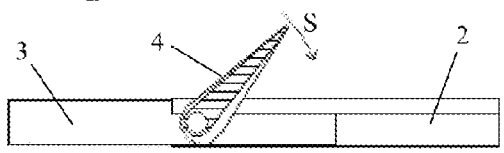
FIG. 60 shows the profile system from FIG. 46 in perspective, with the construction profiles being telescopically moved with respect to each other and the tension clamp being in the engagement position.
Figure 62:
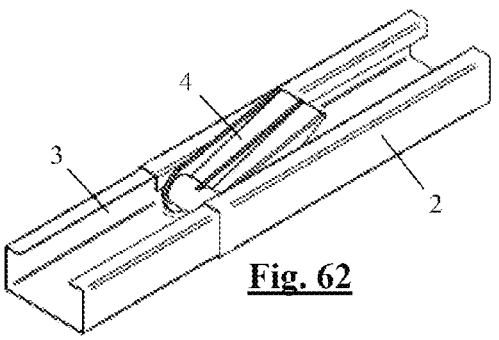
FIG. 62 shows the profile system from FIG. 46 in perspective, with the construction profiles being telescopically moved with respect to each other and the tension clamp being in a position between the engagement position and the closed position.
Figure 61:
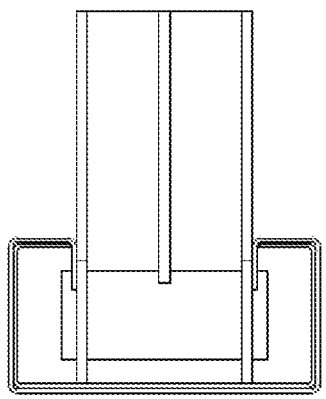
FIG. 61 shows the profile system from FIG. 46 in side view from a front side of the construction profiles, with the tension clamp being in the engagement position.
Figure 63:
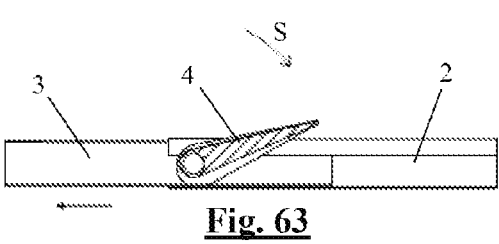
FIG. 63 shows the profile system from FIG. 46 in longitudinal section, with the construction profiles being telescopically moved with respect to each other and the tension clamp being in a position between the engagement position and the closed position.
Figure 64:
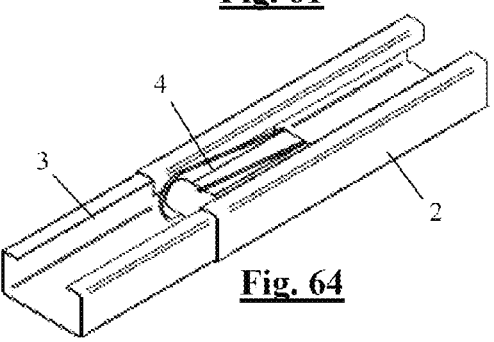
FIG. 64 shows the profile system from FIG. 46 in perspective, with the construction profiles being telescopically moved with respect to each other and the tension clamp being in the closed position.
Figure 66:
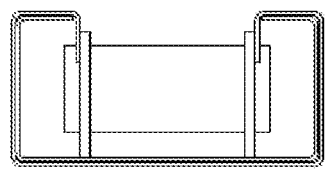
FIG. 66 shows the profile system from FIG. 46 in side view from a front side of the construction profiles, with the tension clamp being in the closed position.
Figure 65:
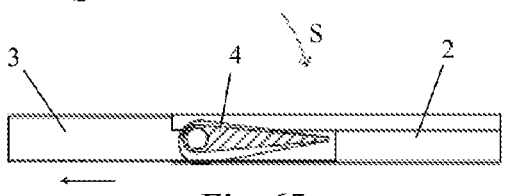
FIG. 65 shows the profile system from FIG. 46 in perspective, with the construction profiles being telescopically moved with respect to each other and the tension clamp being in the closed position.
Figure 71:
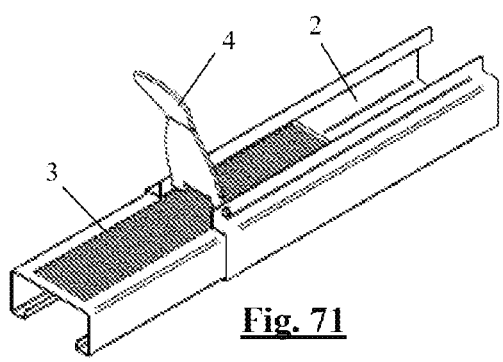
FIG. 71 shows the profile system from FIG. 67 in perspective, with the construction profiles being telescopically moved with respect to each other and the tension clamp being in a position between the open position and the engagement position.
Figure 73:
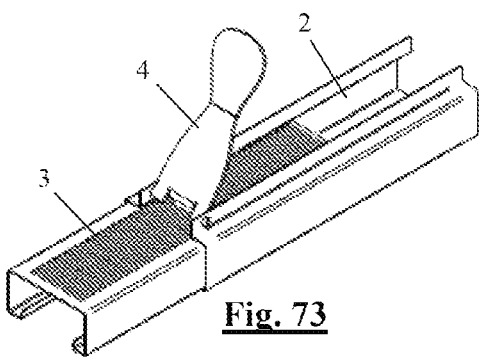
FIG. 73 shows the profile system from FIG. 67 in perspective, with the construction profiles being telescopically moved with respect to each other and the tension clamp being in the engagement position.
Figure 72:
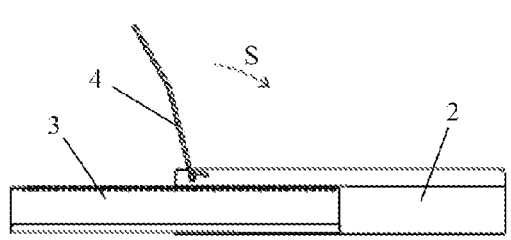
FIG. 72 shows the profile system from FIG. 67 in longitudinal section, with the construction profiles being telescopically moved with respect to each other and the tension clamp being in a position between the open position and the engagement position.
Figure 74:
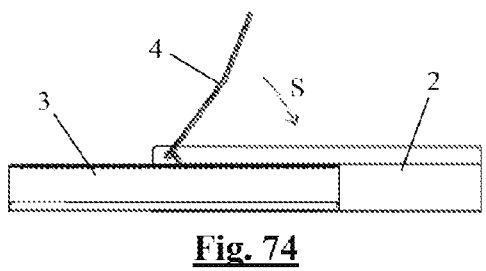
FIG. 74 shows the profile system from FIG. 67 in longitudinal section, with the construction profiles being telescopically moved with respect to each other and the tension clamp being in the engagement position.
Figure 75:
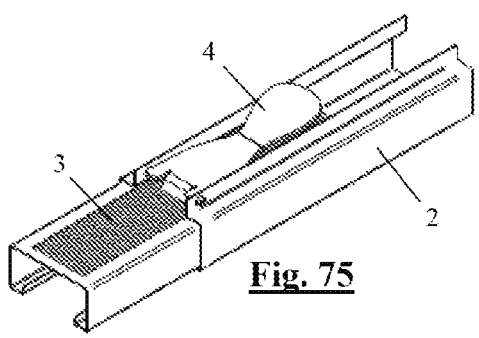
FIG. 75 shows the profile system from FIG. 67 in perspective, with the construction profiles being telescopically moved with respect to each other and the tension clamp being in a position between the engagement position and the closed position.
Figure 77:
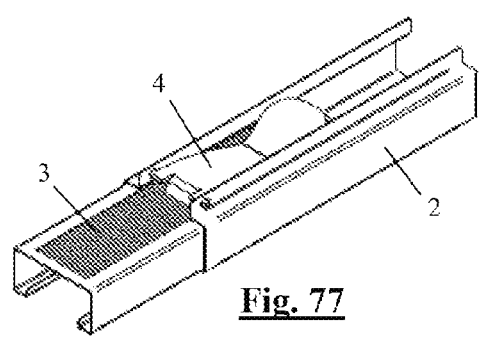
FIG. 77 shows the profile system from FIG. 67 in perspective, with the construction profiles being telescopically moved with respect to each other and the tension clamp being in the closed position.
Figure 76:
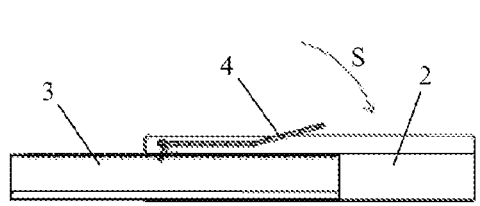
FIG. 76 shows the profile system from FIG. 67 in longitudinal section, with the construction profiles being telescopically moved with respect to each other and the tension clamp being in a position between the engagement position and the closed position.
Figure 78:
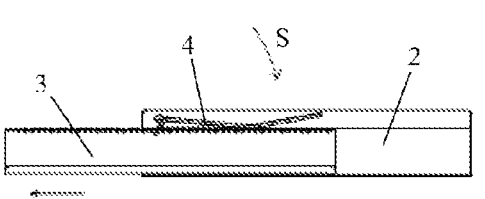
FIG. 78 shows the profile system from FIG. 67 in longitudinal section, with the construction profiles being telescopically moved with respect to each other and the tension clamp being in the closed position.
Figure 79:
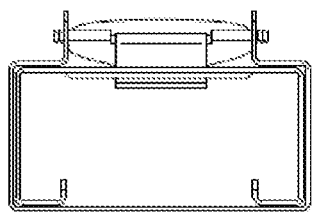
FIG. 79 shows the profile system from FIG. 67 in side view from a front side of the construction profiles, with the tension clamp being in the closed position.
Figure 80:
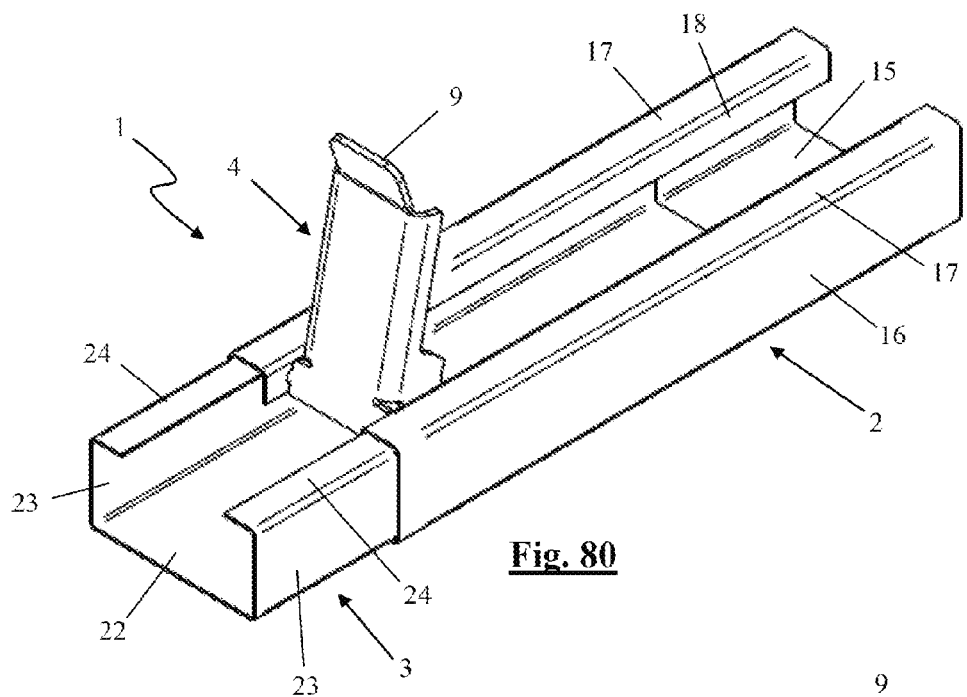
FIG. 80 shows a sixth embodiment of a profile system according to the present invention in perspective at the location of the tension clamp, with this tension clamp being in an open position.
Figures 82, 83:
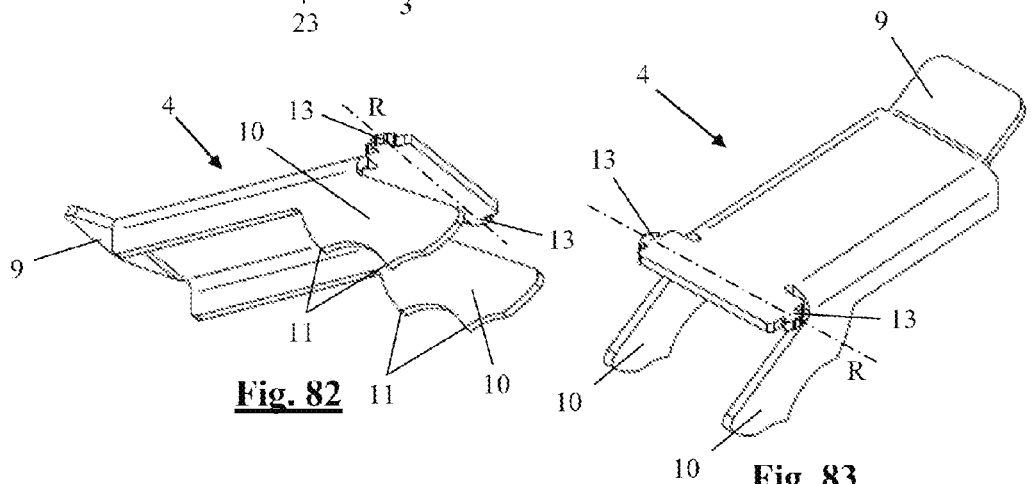
FIG. 82 shows the tension clamp from the profile system from FIG. 80 separately in perspective, viewed from the top side thereof.
FIG. 83 shows the tension clamp from the profile system from FIG. 80 separately in perspective, viewed from the bottom side thereof.
Figure 81:
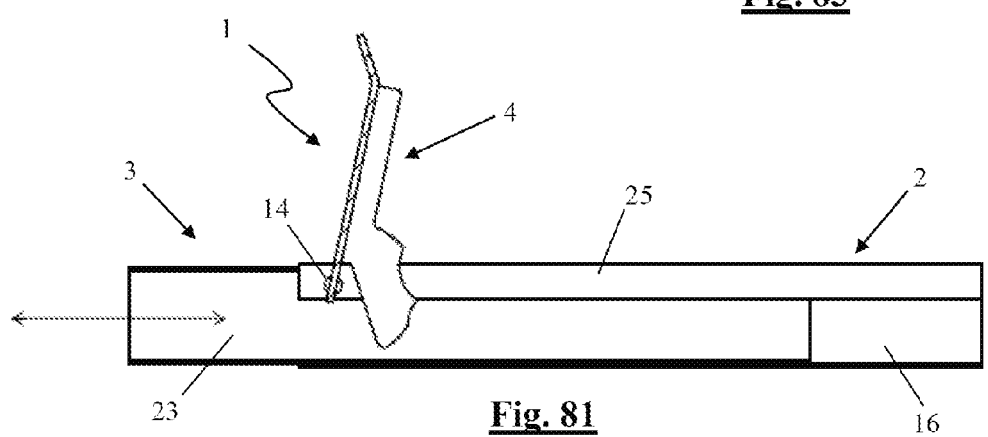
FIG. 81 shows the profile system from FIG. 80 in longitudinal section, with the tension clamp being in an open position.
Figure 84:
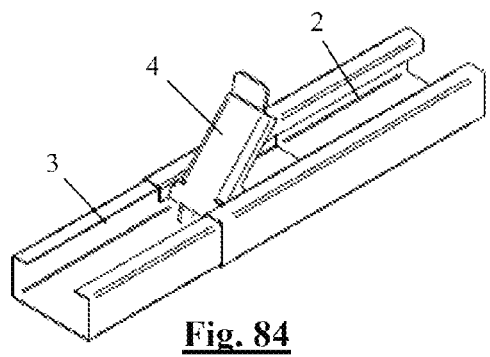
FIG. 84 shows the profile system from FIG. 80 in perspective, with the construction profiles being telescopically moved with respect to each other and the tension clamp being in the engagement position.
Figure 87:
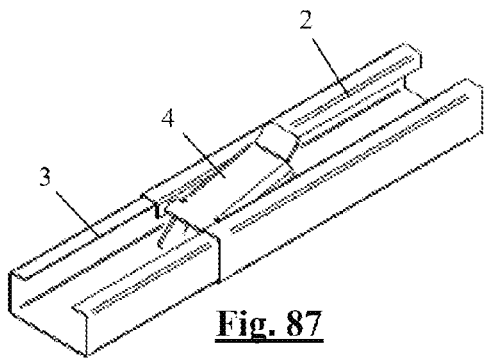
FIG. 87 shows the profile system from FIG. 80 in perspective, with the construction profiles being telescopically moved with respect to each other and the tension clamp being in a position between the engagement position and the closed position.
Figure 85:
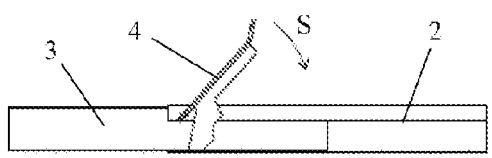
FIG. 85 shows the profile system from FIG. 80 in longitudinal section, with the construction profiles being telescopically moved with respect to each other and the tension clamp being in the engagement position.
Figure 88:
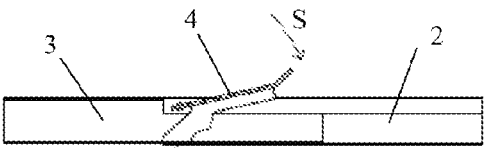
FIG. 88 shows the profile system from FIG. 80 in longitudinal section, with the construction profiles being telescopically moved with respect to each other and the tension clamp being in a position between the engagement position and the closed position.
Figure 86:
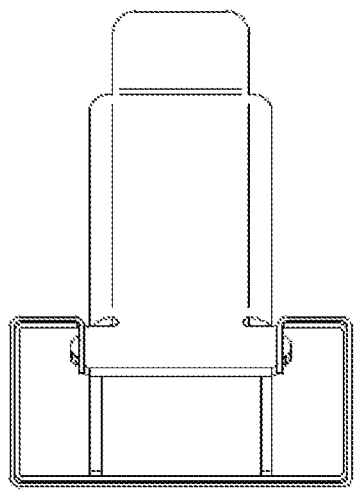
FIG. 86 shows the profile system from FIG. 80 in side view from a front side of the construction profiles, with the tension clamp being in the engagement position.
Figure 89:
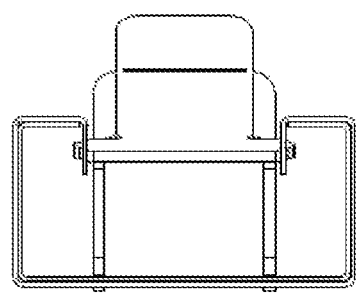
FIG. 89 shows the profile system from FIG. 80 in side view from a front side of the construction profiles, with the tension clamp being in a position between the engagement position and the closed position.
Figure 91:
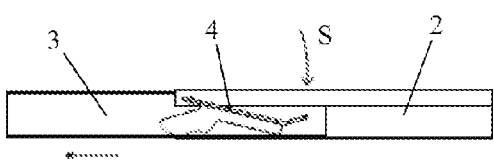
FIG. 91 shows the profile system from FIG. 80 in longitudinal section, with the construction profiles being telescopically moved with respect to each other and the tension clamp being in the closed position.
Figure 90:
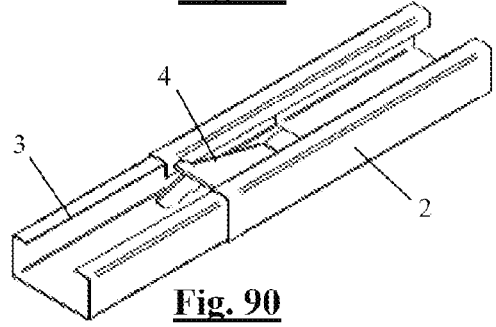
FIG. 90 shows the profile system from FIG. 80 in perspective, with the construction profiles being telescopically moved with respect to each other and the tension clamp being in the closed position.
Figure 92:
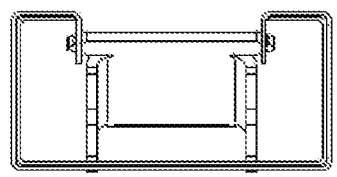
FIG. 92 shows the profile system from FIG. 80 in side view from a front side of the construction profiles, with the tension clamp being in the closed position.

In this case, the tension clamp (4) is attached above the second construction profile (3) so as to be hingeable between and on the side walls (16) of the first construction profile (2). This tension clamp (4) always extends at least partly into the space between these side walls (16). In the closed position, this tension clamp (4) extends virtually completely inside this space, as can be seen in FIGS. 43-45. In order to engage with the second construction profile (3), the tension clamp (4) here engages with the upright edges (24) of this second construction profile (3).

Several variants of the construction profiles (2, 3) shown here, the way of arranging these construction profiles (2, 3) with respect to each other and the way of hingeably arranging the tension clamp (4) with respect to the first construction profile (2) and engagement thereof with the second construction profile (3) are of course conceivable.

In this case, the tension clamp (4) may also assume various forms. In the first, second, third, fifth and sixth embodiment, it is made from steel by means of punching and bending. In the fourth embodiment, it is made from plastic by means of injection-moulding. Many alternatives thereto are conceivable.

In each case, the tension clamp (4) in the illustrated embodiments is provided with axle stubs (13) which are fittable in a fitting cavity (14) in the flanges (18) or in the side walls (16) of the first construction profile (2).

In the first, second, third, fifth and sixth embodiment, the axle stubs (13) are punched-out parts which comprise a constriction and a widened section. Here, the fitting cavity (14) is an opening in which these axle stubs (13) are arranged so as hingeable. In this case, the flanges (18) or side walls (16) of the first construction profile (2) engage with the constriction and the widened section makes it more difficult for these axle stubs (13) to become dislodged from the fitting cavity (14). Instead of providing this widened section, it would also be possible to bend (parts of) axle stubs (13) in order to make it more difficult for them to become dislodged.

In the fourth embodiment, the tension clamp (4) comprises a cylindrical body (19) and the axle stubs (13) are cylindrically projecting parts thereof. The fitting cavity (14) is provided on the edge of the flange (18), so that the axle stub (13) can be introduced into and removed from this fitting cavity (14) freely, when the tension clamp (4) is tilted in a position which corresponds to a position in the open position, as can be seen in FIGS. 51-54.

Instead of providing the tension clamp (4) so as to be hingeable by means of such axle stubs (13), it could, for example, also be hingeably attached by means of bolts and nuts, with pins, etc.

In the illustrated embodiments, the tension clamps (4) in each case comprise at least one engagement element (10) for therewith engaging the second construction profile (3) and a handle (9) for manually driving the hinging movement(S). The engagement element (10) is in each case arranged eccentrically with respect to the hinge axis (R) about which the tension clamp (4) is rotatable.

In the first, second, third and fifth embodiment, the handle (9) is bent at an angle with respect to the engagement element (10), so that they do not extend in line with one another. In this case, the bending lines in the tension clamp (4) extend virtually parallel to the axis of rotation (R).

In the fourth embodiment, two engagement ribs (20) which project with respect to the cylindrical body (19) and the handle (9) serve as engagement elements (10). A reinforcing rib (21) is also arranged between both engagement ribs (20).

In the sixth embodiment the tension clamp (4) is provided with two engagement legs (10), which are bent with respect to the rest of the tension clamp (4) and have a bending line which extends at right angles to the axis of rotation (R).

In order to allow the tension clamp (4) to engage with the second construction profile (3) to a sufficient degree in order to be able to fix both construction profiles (2, 3) with respect to each other, several aids may be provided.

In the first, second, third and sixth embodiment, the tension clamps (14) are provided with one or several engagement pins (11), by means of which these can engage with the second construction profile (3). In this case, several variants are possible in each case. Thus, FIGS. 19-24 show how, in the second embodiment, it is alternatively also possible to provide no engagement pins (11) (see FIGS. 21 and 22) or a single engagement pin (see FIGS. 23 and 24) instead of two engagement pins (11) (see FIGS. 19 and 20). Also, it is obviously possible to provide more than two engagement pins (11). In the first, second and third embodiment, the engagement pins (11) are provided in such a way that they engage with the second construction profile (3) virtually simultaneously. In the sixth embodiment, the engagement pins (11) are provided in such a way that the several engagement pins (11) of each engagement leg (10) successively engage with the second construction profile (3) during the rotating movement (R).

If no engagement pins (11) are provided, the engagement element (10) is preferably at least made partly elastic.

Alternatively or additionally, the second construction profile (3) may be provided with engagement slots (12) with which the engagement element (10) can engage more easily, as can be seen in the fifth embodiment. In this embodiment, these engagement slots (12) are provided in the bottom (22), since the engagement element (10) engages with this bottom (22). Where the engagement element (10) engages on upright edges (24), such as in the third embodiment, these upright edges (24) may optionally be provided with such engagement slots (12). Such engagement slots (12) preferably extend virtually perpendicular to the longitudinal direction of the second construction profile.

In the fourth embodiment, the tension clamp (4) is provided with several engagement ribs (10) for engaging with the second construction profile (3).

In the sixth embodiment, the tension clamp (4) is provided with several engagement legs (10) for engaging with the second construction profile (3).

The invention claimed is:

1. Modifiable profile system for constructing a wall, comprising:
    two construction profiles which are displaceable telescopically with respect to each other and which are fixable with respect to each other, and
    a tension clamp which is provided so as to be hingeable with respect to a hinge axis of a first construction profile of the two construction profiles between an open position, in which the two construction profiles are displaceable with respect to each other, and a closed position, in which the tension clamp engages with a second construction profile of the two construction profiles, so that the construction profiles are fixed with respect to each other,
    wherein the tension clamp comprises a handle and at least one engagement element,
    wherein the handle drives hinging movement of the tension clamp between the open position and the closed position, during which the at least one engagement element engages with the second construction profile from an engagement position to the closed position, in such a manner that the tension clamp exerts a longitudinal force on the two construction profiles between the engagement position and the closed position in order to force the two construction profiles telescopically apart in a longitudinal direction;
    wherein the hinge axis extends perpendicular to the longitudinal direction,
    wherein the at least one engagement element engages with the second construction profile in the engagement position, continues engaging with the second construction profile as the tension clamp moves from the engagement position to the closed position, and remains engaged with the construction profile in the closed position,
    wherein in the closed position, the tension clamp exerts a perpendicular force on the two construction profiles in a direction perpendicular to the longitudinal direction, increasing friction force between the two construction profiles and fixing them with respect to each other.

2. Profile system according to claim 1, wherein in the engagement position, the at least one engagement element engages the second construction profile at a first side of the hinge axis where the handle extends,
    wherein in the closed position, the at least one engagement element engages the second construction profile at a second side of the hinge axis opposite the first side of the hinge axis where the handle extends, and
    wherein at least one contact point between the at least one engagement element and the second construction profile moves from the first side of the hinge axis to the second side of the hinge axis during the hinging movement.

3. Profile system according to claim 1, wherein in the closed position, the handle contacts the second construction profile on a first side of the hinge axis.

4. Profile system according to claim 1, wherein the handle drives hinging movement of the tension clamp between the closed position and the open position, during which the at least one engagement element engages with the second construction profile from the closed position to the engagement position, in such a manner that the tension clamp exerts a longitudinal force on the two construction profiles between the closed position and the engagement position in order to force the two construction profiles telescopically together in the longitudinal direction.

5. Profile system according to claim 1, wherein the at least one engagement element comprises one or several engagement pins for engaging with the second construction profile by means of the one or several engagement pins.

6. Profile system according to claim 1, wherein the second construction profile is provided with one or several engagement slots for the engagement element to engage with the second construction profile.

7. Profile system according to claim 6, wherein the engagement slots extend virtually perpendicular to the longitudinal direction of the second construction profile.

8. Profile system according to claim 1, wherein the at least one engagement element is at least partly made from elastic material.

9. Profile system according to claim 1, wherein the tension clamp is rotatably attached to the first construction profile in order to arrange the tension clamp so as to be hingeable with respect to the first construction profile.

10. Profile system according to claim 1, wherein the tension clamp comprises an axle stub, and wherein the first construction profile comprises a fitting cavity in which the axle stub of the tension clamp is fittable in order to arrange the tension clamp so as to be hingeable with respect to the first construction profile.

11. Profile system according to claim 1, wherein the first construction profile comprises a bottom and two side walls which are upright with respect to the bottom and which delimit a cavity, in which the second construction profile is arranged so as to be telescopically displaceable.

12. Profile system according to claim 11, wherein the two side walls are provided with flanges, wherein the tension clamp is provided so as to be hingeable with respect to the flanges.

13. Profile system according to claim 12, wherein each side wall, away from the bottom, is provided with an upright edge and wherein the corresponding flange at the end of the upright edge, away from the side wall, is upright with respect to this upright edge.

14. Profile system according to claim 12, wherein the tension clamp extends substantially between the flanges.

15. Profile system according to claim 11, wherein the bottom is flat and the two side walls are perpendicular to the bottom, and wherein the tension clamp is disposed entirely inside the cavity in the closed position.

16. Profile system according to claim 1, wherein the second construction profile comprises a bottom and two side walls which are upright with respect to the bottom and which delimit a cavity.

17. Wall system, comprising:
at least one profile system according to claim 1, wherein the at least one profile system is part of a frame; and
wall elements for attachment to the frame, and
wherein the wall elements comprise one or more portions of a wall.

18. Profile system according to claim 1, wherein the first construction profile is structurally different than the second construction profile.

19. Frame system comprising several construction profiles, the several construction profiles comprising:
at least one floor profile configured to be attached to a floor,
at least one ceiling profile configured to be attached to a ceiling, and
at least one profile system according to claim 1,
wherein the at least one floor profile, the at least one ceiling profile, and the at least one profile system according to claim 1 are arranged in a frame shape.

20. Profile system according to claim 1, wherein, when the tension clamp moves from the engagement position to the closed position and vice versa, the at least one engagement element and/or at least one of the two construction profiles is elastically deformed, and wherein in the closed position, the elastic deformation is released.

21. Profile system according to claim 1, wherein in the open position the tension clamp does not engage with the second construction profile.

22. Profile system according to claim 1, wherein the tension clamp comprises an end that engages with the second construction profile during the hinging movement between the open position and the closed position, wherein the end is not rotatable with respect to a remainder of the tension clamp.

23. Profile system according to claim 1, wherein the tension clamp does not utilize gears or teeth.

24. Profile system according to claim 1, wherein the tension clamp engages with a flat surface of the second construction profile.

25. Profile system according to claim 1, wherein the longitudinal force on the two construction profiles clamps the two construction profiles between a floor and a ceiling.

26. Profile system according to claim 1, wherein the tension clamp comprises a first arm physically connected to a second arm, wherein the first arm is longer than the second arm, and wherein the second arm, in the open position, has an end disposed inside a cavity of the first construction profile.

27. Profile system according to claim 26, wherein the first arm and the second arm are disposed relative to each other at an angle that is at least 90 degrees.

28. Profile system according to claim 1, wherein the two construction profiles are manufactured by bending from one or more steel plates.

29. Profile system according to claim 1, wherein the tension clamp comprises an engagement portion that engages with the second construction profile during the hinging movement between the open position and the closed position from an engagement position to the closed position, wherein the engagement portion is arranged eccentrically with respect to a hinge axis around which the tension clamp rotates.

30. Modifiable profile system for constructing a wall, comprising:
a first construction profile and a second construction profile, the first construction profile being displaceable telescopically with respect to the second construction profile, and the second construction profile being displaceable telescopically with respect to the first construction profile; and
at least one clamp for fixing the first construction profile in a fixed position relative to the second construction profile, the at least one clamp comprising a handle;
wherein the handle is hingeable, with respect to the first construction profile, about a hinge axis,
wherein the hinge axis is perpendicular to a longitudinal direction of the first construction profile and the second construction profile,
wherein the at least one clamp is moveable between an open position, a closed position, and an intermediate engagement position between the open position and the closed position,
wherein, when the at least one clamp is in the open position, the first construction profile is moveable with respect to the second construction profile,
wherein, when the at least one clamp is in the closed position, the at least one clamp exerts a perpendicular force on the first and second construction profiles in a direction perpendicular to the longitudinal direction, increasing friction force between the first and second construction profiles so that the first construction profile is in the fixed position relative to the second construction profile,
wherein, when the at least one clamp is in the intermediate engagement position, the at least one clamp engages with the second construction profile at a first side of the hinge axis, where the handle extends, and as the at least one clamp moves from the intermediate engagement position to the closed position, the at least one clamp physically forces the first construction profile longitudinally apart from the second construction profile,
wherein, when the at least one clamp is in the closed position, the at least one clamp engages the second construction profile at a second side of the hinge axis opposite where the handle extends, and
wherein, when the at least one clamp moves from the intermediate engagement position to the closed position and vice versa, at least one portion of the at least one clamp and/or at least one of the first construction profile or the second construction profile is elastically deformed, and wherein in the closed position, the elastic deformation is released.

31. Profile system according to claim 30, wherein the first construction profile comprises:
a bottom surface; and
two side walls connected to the bottom surface,
wherein the two side walls comprise at least one wall element,
wherein the two side walls are upright with respect to the bottom surface,
wherein a first side wall of the two side walls is disposed parallel to a second side wall of the two side walls,
wherein the bottom surface and the two side walls delimit an open cavity, and
wherein the second construction profile is disposed within the open cavity.

32. Profile system according to claim 30, wherein the at least one clamp is a single piece.

33. Modifiable profile system for constructing a wall, comprising:
a first construction profile;
a second construction profile; and
a tension clamp, wherein the first construction profile and the second construction profile are moveable between (i) an open position, in which the first construction profile and the second construction profile are displaceable telescopically with respect to each other, and (ii) a closed position, in which the tension clamp engages with the second construction profile so that the first construction profile and the second construction profile are fixed with respect to each other, wherein the tension clamp is hingeable with respect to the first construction profile during the movement from the open position to the closed position, wherein, during the movement, the tension clamp engages with the second construction profile at an engagement position, wherein the tension clamp exerts a friction force on the second construction profile between the engagement position and the closed position to force the first construction profile and the second construction profile telescopically apart in a longitudinal direction, wherein the tension clamp comprises a first arm physically connected to a second arm, wherein the first arm and the second arm are disposed relative to each other at an angle that is at least 90 degrees, wherein the second arm engages with the second construction profile at the engagement position, continues engaging with the second construction profile as the tension clamp moves from the engagement position to the closed position, and remains engaged with the construction profile in the closed position, wherein the second arm exerts the friction force, and wherein the tension clamp exerts a friction force on the second construction profile between the closed position and the engagement position to force the first construction profile and the second construction profile telescopically together in the longitudinal direction.

34. Profile system according to claim 33, wherein the tension clamp comprises a handle that is hingeable with respect to a hinge axis that extends perpendicular to the longitudinal direction, wherein in the engagement position, the tension clamp engages the second construction profile at a first side of the hinge axis where the handle extends, and wherein in the closed position, the tension clamp engages the second construction profile at a second side of the hinge axis opposite where the handle extends.

35. Profile system according to claim 33, wherein the tension clamp further comprises two protrusions that physically connect to the first construction profile, wherein the two protrusions are disposed on opposite sides of the tension clamp at an intersection of the first arm and the second arm.

* * * * *